(12) United States Patent
Lee et al.

(10) Patent No.: US 11,507,799 B2
(45) Date of Patent: Nov. 22, 2022

(54) INFORMATION PROCESSING APPARATUS AND METHOD OF OPERATING NEURAL NETWORK COMPUTING DEVICE THEREIN

(71) Applicant: ELECTRONICS AND TELECOMMUNICATIONS RESEARCH INSTITUTE, Daejeon (KR)

(72) Inventors: Mi Young Lee, Daejeon (KR); Joo Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 415 days.

(21) Appl. No.: 16/808,124

(22) Filed: Mar. 3, 2020

(65) Prior Publication Data
US 2020/0327390 A1    Oct. 15, 2020

(30) Foreign Application Priority Data

Apr. 9, 2019    (KR) .......................... 10-2019-0041648

(51) Int. Cl.
*G06N 3/04*    (2006.01)
*G06F 12/02*    (2006.01)
(Continued)

(52) U.S. Cl.
CPC ........... *G06N 3/04* (2013.01); *G06F 12/0238* (2013.01); *G06N 3/063* (2013.01)

(58) Field of Classification Search
CPC ........................... G06F 13/1689; G06N 3/084
See application file for complete search history.

(56) References Cited

U.S. PATENT DOCUMENTS

| | | | |
|---|---|---|---|
| 11,288,019 B2* | 3/2022 | Hsieh | G06F 3/0688 |
| 2004/0042456 A1* | 3/2004 | Dittmann | H04L 47/50 370/428 |

(Continued)

FOREIGN PATENT DOCUMENTS

KR    20180120968 A    11/2018

OTHER PUBLICATIONS

Linnan Wang et al., "SuperNeurons: Dynamic GPU Memory Management for Training Deep Neural Networks", ACM SIGPLAN Notices, Jan. 13, 2018.

*Primary Examiner* — Getente A Yimer

(57) ABSTRACT

Provided is a method of operating a neural network computing device that is configured to communicate with an external memory device and execute a plurality of layers. The method includes computing a first input address, based on first layer information of a first layer among the plurality of layers and a first memory management table, and updating the first memory management table to generate a second memory management table, reading first input data to be input to the first layer from the external memory device, based on the computed first input address, computing a first output address, based on the first layer information and the second memory management table, and updating the second memory management table to generate a third memory management table, and storing first output data output from the first layer, based on the first output address, in the external memory device.

18 Claims, 18 Drawing Sheets

(51) Int. Cl.
*G06N 3/063* (2006.01)
*G06N 3/08* (2006.01)

(56) References Cited

U.S. PATENT DOCUMENTS

| | | | |
|---|---|---|---|
| 2007/0074255 A1* | 3/2007 | Morioka | H04N 21/47214 |
| | | | 725/78 |
| 2010/0070731 A1* | 3/2010 | Mizuno | G06F 1/3268 |
| | | | 711/170 |
| 2015/0212741 A1 | 7/2015 | Lee et al. | |
| 2018/0068218 A1* | 3/2018 | Yoo | G06N 3/084 |
| 2018/0088996 A1 | 3/2018 | Rossi et al. | |
| 2018/0300601 A1* | 10/2018 | Cedola | G06F 13/1689 |
| 2018/0308215 A1 | 10/2018 | Veernapu et al. | |
| 2018/0336076 A1 | 11/2018 | Lim et al. | |

\* cited by examiner

| Edge | Source | Target | Size | Toggle | Merge | Offset |
|---|---|---|---|---|---|---|
| E# | LAY or DT | LAY or DT | SIZE | 0 or 1 | T or T(b) | OFS |

FIG. 10A
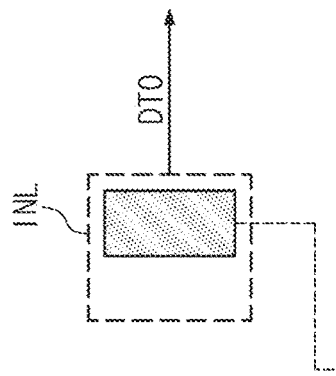
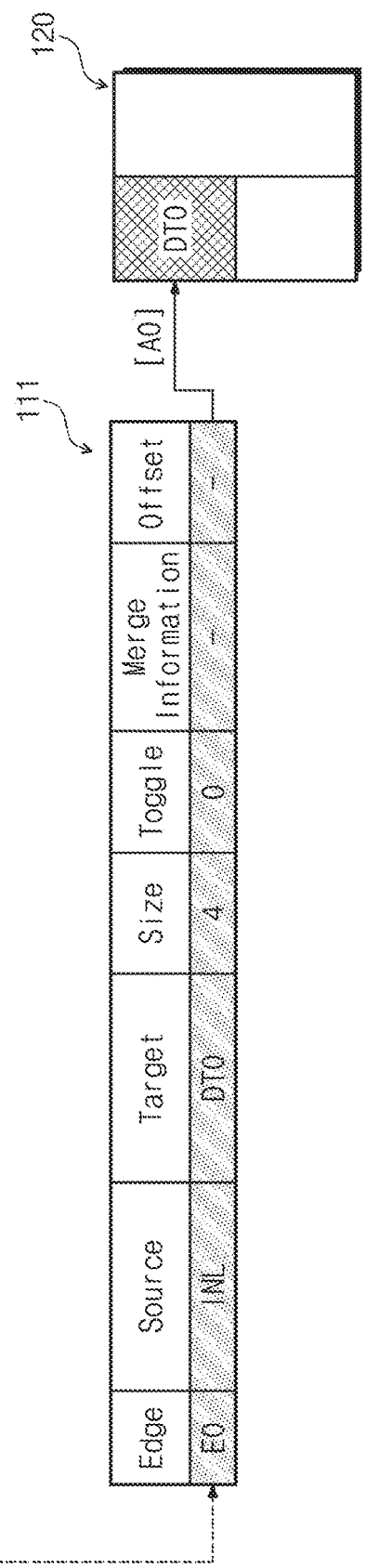

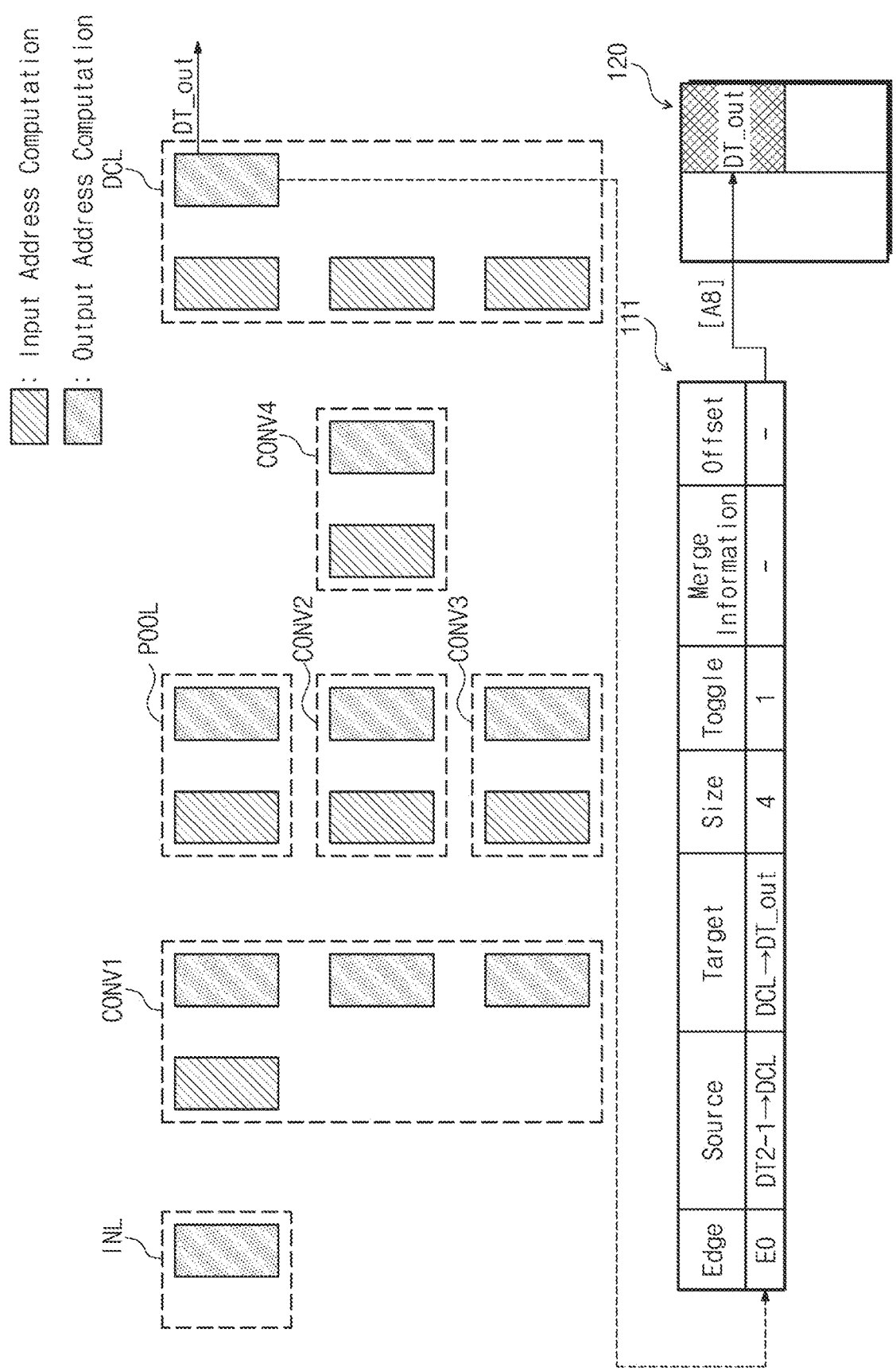

INFORMATION PROCESSING APPARATUS AND METHOD OF OPERATING NEURAL NETWORK COMPUTING DEVICE THEREIN

CROSS-REFERENCE TO RELATED APPLICATIONS

This U.S. non-provisional patent application claims priority under 35 U.S.C. § 119 of Korean Patent Application No. 10-2019-0041648, filed on Apr. 9, 2019, the entire contents of which are hereby incorporated by reference.

BACKGROUND

Embodiments of the inventive concept relate to an information processing technology, and more particularly, relate to an information processing apparatus and a method of operating a neural network processing device included therein.

Recently, a convolutional neural network (hereinafter referred to as CNN), which is one of deep neural network techniques, has actively studied as a technology for an image recognition. A neural network structure is excellent in various object recognition fields such as an object recognition and a handwriting recognition. In particular, the CNN provides very effective performance for the object recognition.

In recent years, while an efficient CNN structure is proposed, the recognition rate using a neural network has reached a level that almost humans may recognize. However, since a CNN neural network structure is very complicated, a large amount of computation is required, and accordingly, a high performance server or a hardware acceleration method using a GPU is used. In addition, since a size of data used in the CNN neural network is enormous, a large capacity and a high speed memory device are required. Therefore, normal neural network operation may be difficult in an environment (e.g., a mobile device) in which the large capacity and the high speed memory device are not supported.

SUMMARY

Embodiments of the inventive concept provide an information processing device for efficiently using an external memory device that has a limited capacity and a method of operating a neural network computing device included therein.

A method of operating a neural network computing device that is configured to communicate with an external memory device and to execute a plurality of layers according to an embodiment of the inventive concept, includes computing a first input address, based on first layer information of a first layer among the plurality of layers and a first memory management table, and updating the first memory management table to generate a second memory management table, reading first input data to be input to the first layer from the external memory device, based on the computed first input address, computing a first output address, based on the first layer information and the second memory management table, and updating the second memory management table to generate a third memory management table, and storing first output data output from the first layer, based on the first output address, in the external memory device, and wherein the first to third memory management tables are associated with the first input data or the first output data, and include information on at least one edge connected to the first layer, and wherein a storage space of the external memory device is less than a total size of data output from the plurality of layers.

In an embodiment, the information on the at least one edge may include a source field, a target field, a size field, a toggle field, and a merge field on the at least one edge.

In an embodiment, the first layer information may include a first layer name on the first layer, a first input data name on the first input data, and a first output data name on the first output data, wherein the source field may be set to any one of the first layer name and the first input data name, wherein the target field may be set to any one of the first layer name and the first output data name, wherein the size field may be set as information on a size of the first input data or the first output data, wherein the toggle field may be set to indicate one of a plurality of regions of the external memory device, and wherein the merge field may be set to indicate whether the at least one edge is to be merged.

In an embodiment, the first layer information may include a first layer name of the first layer and a first input data name on the first input data.

The computing of the first input address, based on the first layer information and the first memory management table, and the updating of the first memory management table to generate the second memory management table, may include searching whether a first target field identical to the first input data name exists in the first memory management table, updating information on a first edge corresponding to the first target field of the at least one edge, when the first target field exists in the first memory management table, and computing the input address, based on the updated information on the first edge.

In an embodiment, the first memory management table may be updated to generate the second memory management table, by changing the source field on the first edge to the input data name and changing the target field on the first edge to the first layer name.

In an embodiment, the computing of the first input address, based on the first layer information and the first memory management table, and the updating of the first memory management table to generate the second memory management table, may further include determining whether a second target field identical to the first layer name exists in the first memory management table, and wherein the first memory management table may be updated to generate the second memory management table, by setting the merge field of the first edge to a first value indicating a base edge when the second target field does not exist in the first memory management table, and by setting the merge field of the first edge to a second value indicating a merge edge when the second target field exists in the first memory management table.

In an embodiment, the method further may include deleting an edge in which the merge field is set to the second value of the at least one edge, based on the second memory management table, after reading the first input data.

In an embodiment, the method may further include changing the toggle field of an edge in which the merge field is set to the first value of the at least one edge, based on the second memory management table, after reading the first input data.

In an embodiment, the first layer information may include a first layer name of the first layer and a first output data name on the first output data, and wherein the computing of the first output address, based on the first layer information and the second memory management table, and the updating of the second memory management table to generate the third memory management table, may include determining whether a first target field identical to the first layer name exists in the second memory management table, adding information on a new edge in the second memory management table, based on the first layer name and the first output data name, when the first target field does not exist in the updated memory management table, updating information on a first edge corresponding to the first target field when the first target field exists in the second memory management table, and computing the first output address, based on the information on the new edge and the information on the updated first edge, and wherein the second memory management table may be updated to generate the third memory management table, by adding the information on the new edge or by updating the information on the first edge.

In an embodiment, the information on the first edge may be updated, when the source field of the first edge is changed to the first layer name, and the target field of the first edge is changed to the output data name.

In an embodiment, the method may further include computing a second input address, based on second layer information of a second layer among the plurality of layers and the third memory management table, and updating the third memory management table to generate a fourth memory management table, and reading second input data on the second layer from the external memory device, based on the computed second input address, and wherein the second input address may be the same as the first output address when the first layer are directly connected to the second layer.

In an embodiment, an output address computed on the at least one of the plurality of layers may be the same as the first input address.

An information processing apparatus according to an embodiment of the inventive concept, includes an external memory device, and a neural network computing device that reads input data from the external memory device, performs a neural network computing operation through a plurality of layers, based on the read input data, and stores a plurality of output data according to the neural network computing operation in the external memory device, and wherein the neural network computing device includes a neural processor that executes each of the plurality of layers, based on the input data to output the output data, an internal memory that stores a memory management table including information on at least one edge associated with the input data and the plurality of output data, and a processor that computes an input address and an output address for each of the plurality of layers, based on the memory management table and layer information of each of the plurality of layers, and a memory controller that reads the input data from the external memory device, based on the input address, and store the output data to the external memory device, based on the output address, and wherein a storage space of the external memory device is less than a total size of the output data from each of the plurality of layers.

In an embodiment, output addresses on at least two layers of the plurality of layers may be the same to each other.

In an embodiment, the information on the at least one edge may include a source field, a target field, a size field, a toggle field, and a merge field on the at least one edge.

In an embodiment, the layer information may include a layer name, an input data name, and an output data name for each of the plurality of layers, wherein the source field may be set, by the processor, to any one of the layer name and the input data name, wherein the target field may be set, by the processor, to any one of the layer name and the output data name, wherein the size field may be set, by the processor, as information on a size of the input data or the output data, wherein the toggle field may be set, by the processor, to indicate one of a plurality of regions of the external memory device, and wherein the merge field may be set, by the processor, to indicate whether the at least one edge is to be merged.

BRIEF DESCRIPTION OF THE FIGURES

The above and other objects and features of the inventive concept will become apparent by describing in detail exemplary embodiments thereof with reference to the accompanying drawings.

FIG. 5 is a diagram illustrating a memory management table of FIG. 1.

FIGS. 9 and 10A to 10I are diagrams describing a memory address computing operation or a memory region allocation operation of a neural network computing device according to an embodiment of the inventive concept.

DETAILED DESCRIPTION

Embodiments of the inventive concept will be described below clearly and in detail such that those skilled in the art may easily practice the inventive concept.

In addition, the functional blocks that are used in the detailed description or drawings may be implemented in software, hardware, or a combination thereof in an embodiment of the inventive concept. The software may be machine code, firmware, embedded code, and application software. The hardware may be a circuit, a processor, a computer, an integrated circuit, integrated circuit cores, a pressure sensor, an inertial sensor, a microelectromechanical system (MEMS), passive elements, or a combination thereof.

Figure 1:
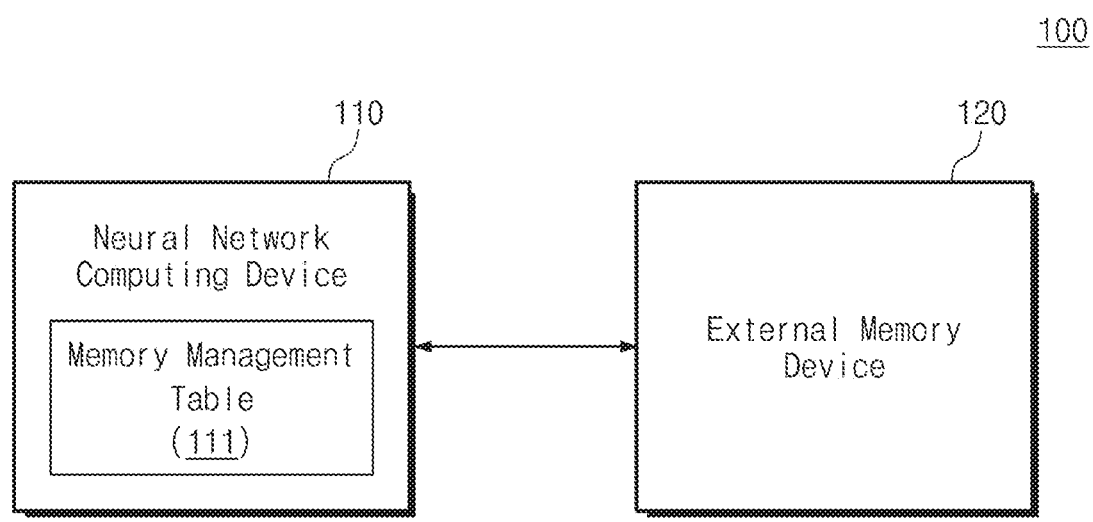
FIG. 1 is a block diagram illustrating an information processing apparatus according to an embodiment of the inventive concept.

FIG. 1 is a block diagram illustrating an information processing apparatus according to an embodiment of the inventive concept. Referring to FIG. 1, an information processing apparatus 100 may include a neural network computing device 110 and an external memory device 120. In an exemplarily embodiment, the information processing device 100 may be one of a variety of computing systems, such as a personal computer, a notebook computer, a smartphone, a tablet, a digital camera, etc.

The neural network computing device 110 may be configured to perform various neural network computing operations. For example, the neural network computing device 110 may identify data from an outside (e.g., an object recognition, an image classification, a location recognition, etc.), based on various machine learning algorithms or artificial intelligence algorithms, such as a convolutional neural network, a deep neural network, etc. As an example, the convolutional neural network may be learned for various purposes (e.g., a universal object recognition, a location recognition, etc.) and may implement various purposes, based on the learned model.

The external memory device 120 may be configured to store data output from the neural network computing device 110 or provide the stored data to the neural network computing device 110. In an example embodiment, the external memory device 120 may be any one of a volatile memory that loses the stored data when power is cut off, such as DRAM, SRAM, etc., and a nonvolatile memory that maintains the stored data even when power is cut off, such as a flash memory, a PRAM, a ReRAM, an MRAM, a FRAM, etc.

In an example embodiment, the neural network computing device 110 may be configured to perform the above-described computation (i.e., a neural network computation) by sequentially processing a plurality of layers. For example, each of the plurality of layers may perform a predetermined computation on input data, and output a result of the performed computation as output data. The output data may be provided as input data of a subsequent layer or a next layer. Since such input data and output data are used in a corresponding layer, the input data and output data are stored and managed in the external memory device 120. In this case, when a capacity of the external memory device 120 is not sufficient to store the input data and the output data of each of the plurality of layers, the neural network computing device 110 may not normally perform the neural network computing operation.

The neural network computing device 110 according to the embodiment of the inventive concept may normally manage the input data and the output data for each of the plurality of layers, by managing the external memory device 120 that has a limited size, based on a memory management table 111. For example, the memory management table 111 may include various information. The various information are information that manage an input address of the external memory device 120 for the input data in a specific layer and an output address of the external memory device 120 for the output data in the specific layer. The memory management table 111 according to an embodiment of the inventive concept will be described in more detail with reference to the following drawings.

Figure 2:
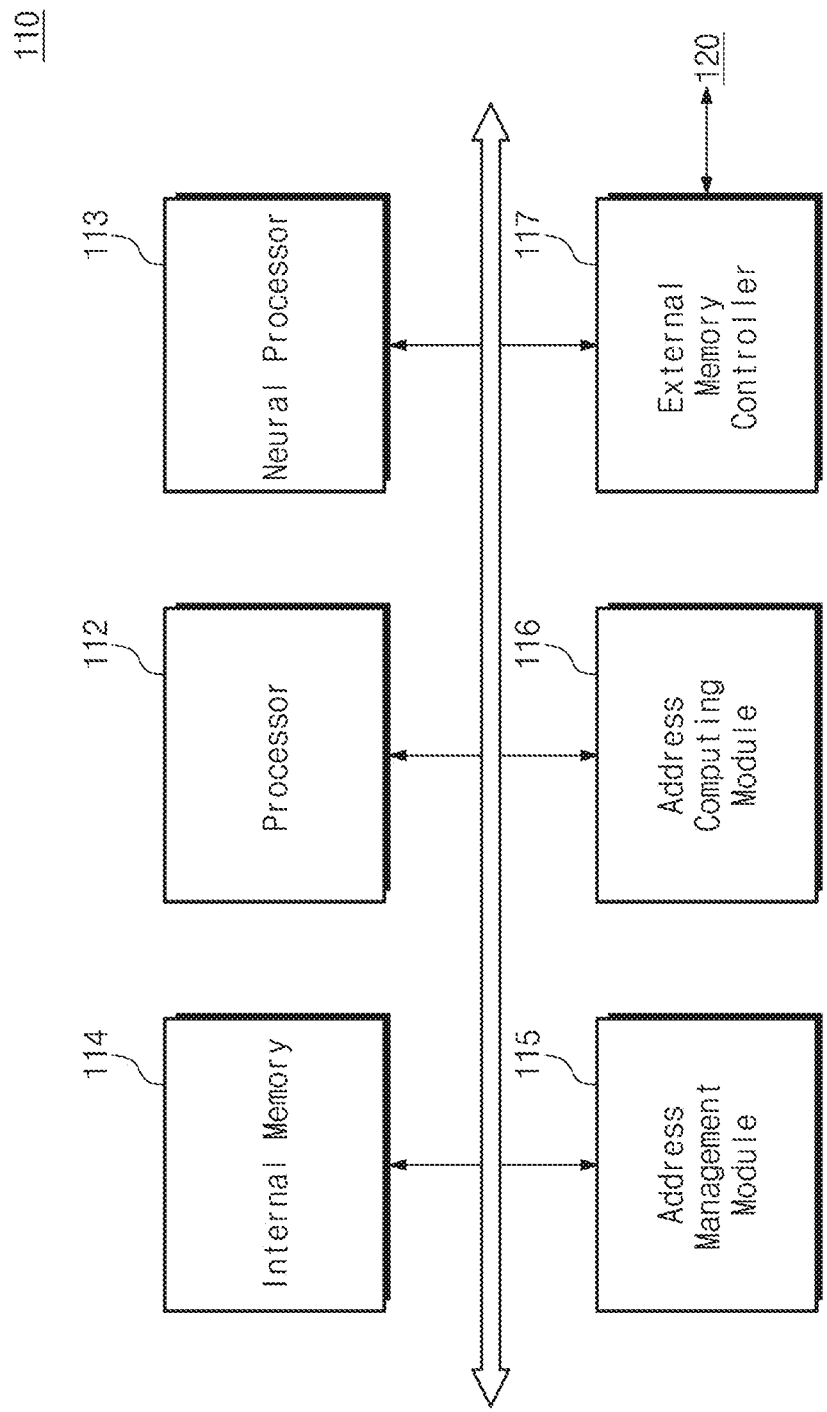
FIG. 2 is a block diagram illustrating a neural network computing device of FIG. 1.

FIG. 2 is a block diagram illustrating a neural network computing device of FIG. 1. Referring to FIGS. 1 and 2, the neural network computing device 110 may include a processor 112, a neural processor 113, an internal memory 114, an address management module 115, an address computing module 116, and an external memory controller 117.

The processor 112 may control general operations of the neural network computing device 110. The neural processor 113 may be configured to perform a computing operation performed on each of the plurality of layers. The internal memory 114 may be used as a buffer memory or an operation memory of the neural network computing device 110.

The address management module 115 may be configured to manage or update the memory management table 111 described with reference to FIG. 1, based on layer information on the plurality of layers that are executed by the neural processor 113. For example, when a computation on a first layer is performed by the neural processor 113, the address management module 115 may manage or update the memory management table 111, based on layer information (e.g., a name of the first layer, a name of the input data of the first layer, a name of the output data of the first layer, etc.) for the first layer.

The address computing module 116 may be configured to compute the input address and the output address of the external memory device 120 for each of the input data and the output data of a layer that is executed by the neural processor 113, based on the memory management table 111 described with reference to FIG. 1. For example, when the neural processor 113 performs the computation on the first layer, the address computing module 116 may calculate the input address and the output address for the first layer, based on the memory management table 111. In this case, the input address for the first layer indicates a position where the input data to be input to the first layer of a storage space of the external memory device 120 are stored, and the output address for the first layer indicates a position where output data to be output from the first layer of the storage space of the external memory device 120 are stored.

In an example embodiment, the memory management table 111 described with reference to FIG. 1 may be stored in the internal memory 114, and managed by the address management module 115 and the address computing module 116. In an example embodiment, the address management module 115 or the address computing module 116 may be implemented in software form, hardware form, or a combination thereof. The address management module 115 or the address computing module 116 in the software form may be stored in the internal memory 114, and program code or instruction stored in the internal memory 114 may be executed by the processor 112. That is, the processor 112 may be configured to perform an operation of the address management module 115 or the address computing module 116.

The external memory controller 117 may be configured to control the external memory device 120. For example, the external memory controller 117 may read the input data from the external memory device 120, based on the input address computed by the address computing module 116, and may transfer the read input data to the neural processor 113. The neural processor 113 may generate the output data by performing the neural network computation based on the received input data.

The external memory controller 117 may store the output data that are generated from the neural processor 113 in the external memory device 120, based on the output address computed by the address computing module 116.

As described above, the neural network computing device 110 may manage the storage space of the external memory device 120, based on the memory management table 111. Alternatively, the neural network computing device 110 may dynamically allocate a space for storing input data or output data used in the neural network computation to the external memory device 120, based on the memory management table 111. Therefore, although the space of the external memory device 120 is limited, since the neural network computing device 110 may dynamically allocate the storage space, based on the memory management table 111, the neural network computing device 110 may operate normally.

Figure 3:
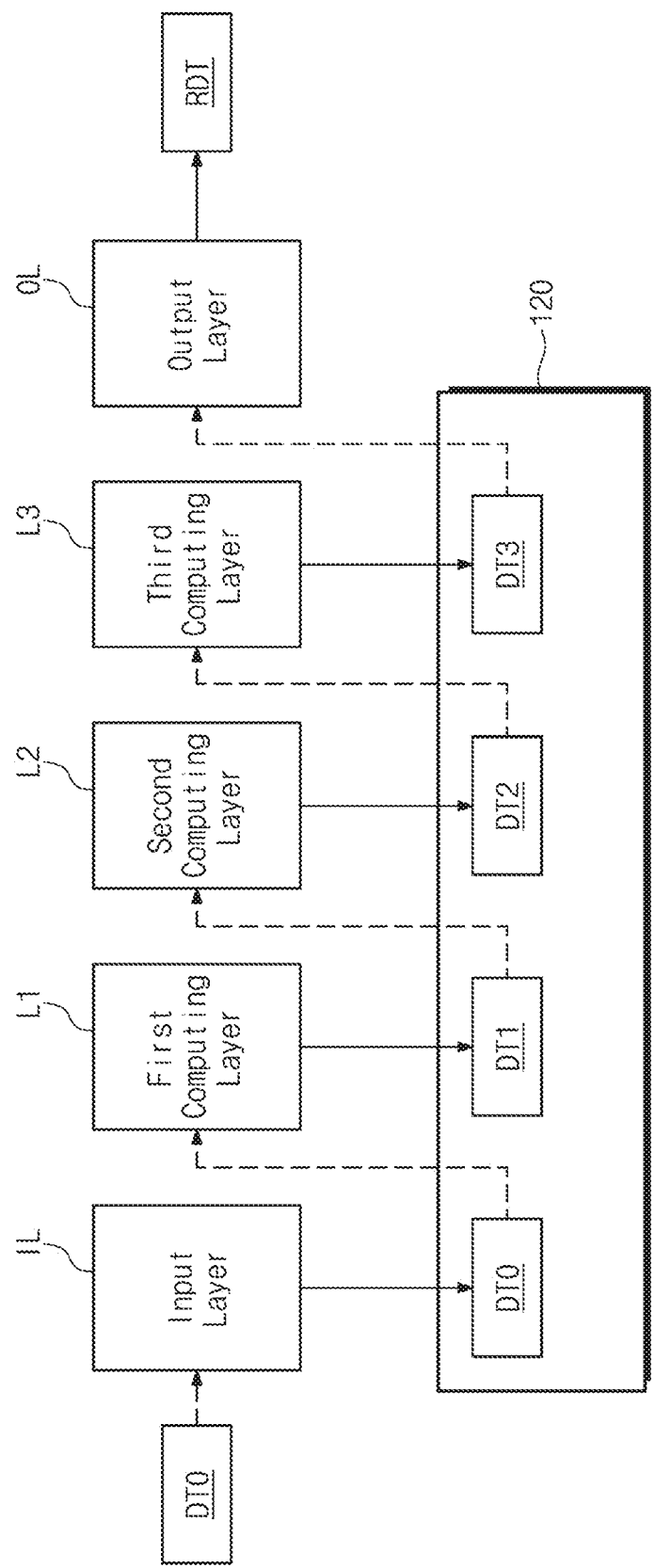
FIG. 3 is a diagram illustrating a neural network computing operation of the neural network computing device of FIG. 1.

FIG. 3 is a diagram illustrating a neural network computing operation of the neural network computing device of FIG. 1. To clearly describe an embodiment of the inventive concept, components unnecessary for performing the neural network computing operation of the neural network computing device 110 are omitted. In addition, in an embodiment of FIG. 3, the neural network computing operation of the neural network computing device 110 is briefly illustrated, but the scope of the inventive concept is not limited thereto. For example, the neural network computing device 110 may be configured to perform computations based on well-known neural network (particularly, the convolutional neural network), such as Inception, ResNet, DenseNet, GoogleNet, VGG, etc.

Referring to FIGS. 1 and 3, the neural network computing device 110 may perform the neural network computing operation on input data DT0 and output output data RDT (or result data) as a result of the neural network computing operation. For example, when the neural network computing device 110 receives image information and classifies the received image information, the input data DT0 may be image data, and the output data RDT may be information about a classification result.

The neural network computing device 110 may perform the neural network computing operation described above by performing a sequential computation through the plurality of layers. For example, the plurality of layers of the neural network computing device 110 may include an input layer IL, first to third computing layers L1 to L3, and an output layer OL.

The input layer IL of the neural network computing device 110 may receive input data DT0, and the received input data DT0 may be stored in the external memory device 120. The first computing layer L1 may receive the input data DT0 stored in the external memory device 120, perform the computation on the received input data DT0, and output the first data DT1. The output first data DT1 may be stored in the external memory device 120.

The second computing layer L2 may receive the first data DT1 stored in the external memory device 120, and may perform the computation on the received first data DT1 to output the second data DT2. The output second data DT2 may be stored in the external memory device 120.

The third computing layer L3 may receive the second data DT2 stored in the external memory device 120, and may perform the computation on the received second data DT2 to output the third data DT3. The output third data DT3 may be stored in the external memory device 120.

The output layer OL may receive the third data DT3 stored in the external memory device 120 and output the received third data DT3 as the output data RDT.

As described above, the output data generated in each of the plurality of layers IL and L1 to L3 may be stored in the external memory device 120 to be transferred to the subsequent layer. When the storage space of the external memory device 120 is less than the size of all of the output data generated in each of the plurality of layers IL and L1 to L3, the neural network computing device 110 may not operate normally.

The neural network computing device 110 according to an embodiment of the inventive concept may manage or compute the output address that indicates a region of the external memory device 120 in which the output data output from each of the plurality of layers are stored, and the input address that indicates the region of the external memory device 120 in which the input data to be input to each of the plurality of layers are stored, based on the layer information for each of the plurality of layers. Accordingly, the neural network computing device 110 according to an embodiment of the inventive concept may normally perform the neural network computing operation, using the external memory device 120 having the limited size.

Although some layers are illustrated in an embodiment of FIG. 3, the scope of the inventive concept is not limited thereto, and the neural network computing device 110 may perform the neural network computing operation through additional layers. In addition, although the configuration in which the plurality of layers are sequentially connected is disclosed in the embodiment of FIG. 3, the scope of the inventive concept is not limited thereto, and the plurality of layers may be connected in various ways.

Figure 4:
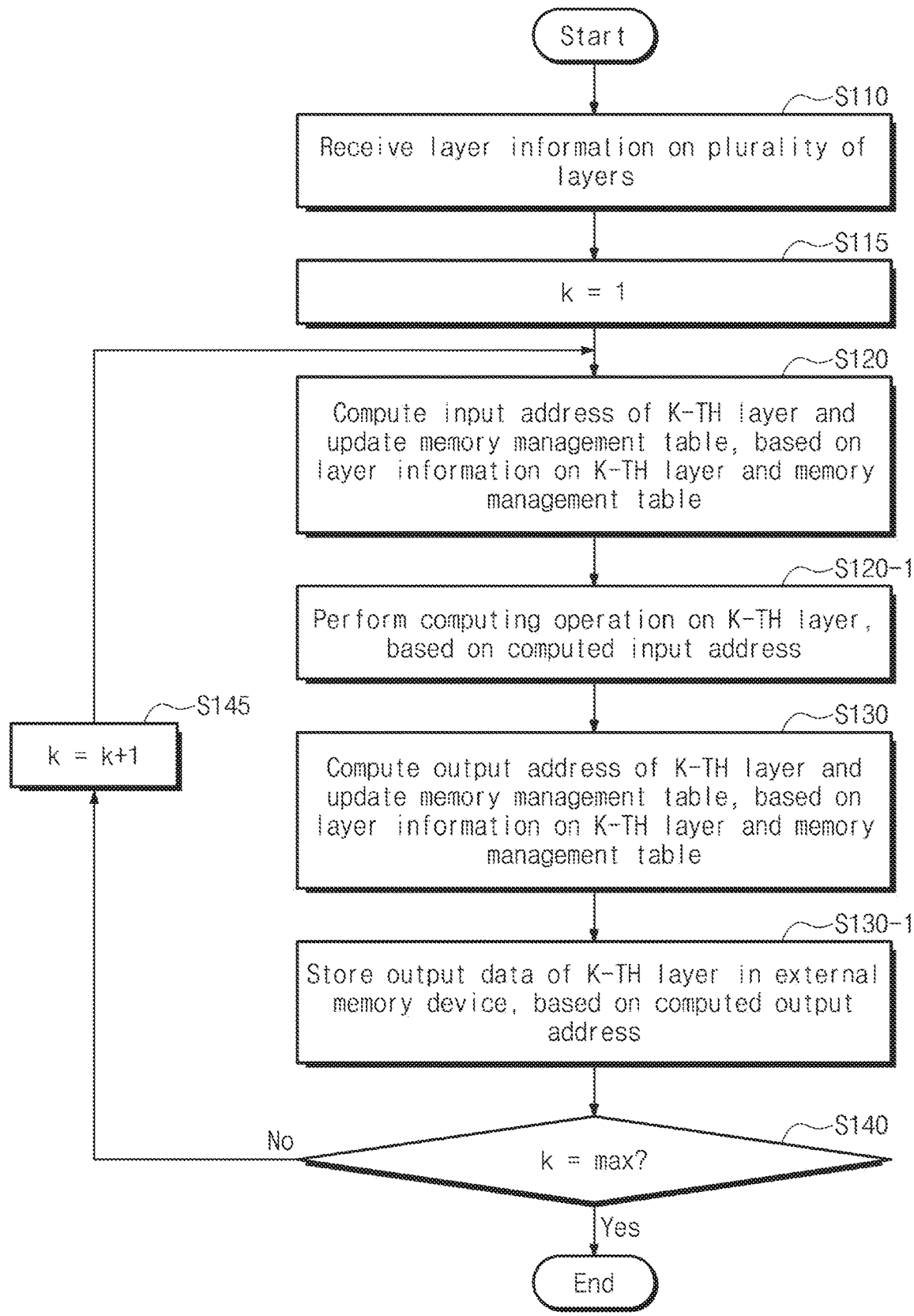
FIG. 4 is a flowchart describing an operation of the neural network computing device of FIG. 1.

FIG. 4 is a flowchart describing an operation of the neural network computing device of FIG. 1. Referring to FIGS. 1 and 4, in operation S110, the neural network computing device 110 may receive the layer information for each of the plurality of layers. For example, the neural network computing device 110 may receive the layer information for each of the plurality of layers included in the neural network computing device 110 from an external device (e.g., a server, an external host, etc.).

In an example embodiment, the layer information on the specific layer may include a layer name of the specific layer, information on the input data input to the specific layer, and information on the output data output from the specific layer. The information on the input data input to the specific layer may include information on an input data name on the input data, the number of the input data, and the size of the input data. The information on the output data output from the specific layer may include information on an output data name on the output data, the number of the output data, and the size of the output data.

In an example embodiment, the above-described layer information may be determined based on a connection relationship of the plurality of layers in the neural network computing operation that is performed by the neural network computing device 110.

In operation S115, a variable k is set to '1'. The variable k in operation S115 is for describing a repetitive operation of the neural network computing device 110 according to an embodiment of the inventive concept, and it will be understood that the scope of the inventive concept is not limited thereto.

In operation S120, the neural network computing device 110 may compute the input address of the k-th layer, based on the layer information on the k-th layer and the memory management table 111. For example, the neural network computing device 110 may search the memory management table 111, based on the layer information of the k-th layer among the input layer information, and may update the memory management table 111, based on the search result. The neural network computing device 110 may compute the input address for the input data input to the k-th layer, based on the updated memory management table 111. In an example embodiment, the neural network computing device 110 may update the memory management table 111, based on the search result.

In operation S120-1, the neural network computing device 110 may perform the computing operation on the k-th layer, based on the computed input address. For example, the neural network computing device 110 may read the input data from the external memory device 120, based on the computed input address, and may perform the neural network computing operation on the read input data.

In an example embodiment, when the number of the input data to be input to the k-th layer is 'n' (where 'n' is an integer greater than '1'), the neural network computing device 110 may repeatedly perform operations S120 and S120-1 up to 'n' times.

In operation S130, the neural network computing device 110 may compute the output address of the k-th layer, based on the layer information for the k-th layer and the memory management table 111. For example, the neural network computing device 110 may search the memory management table 111, based on the layer information of the k-th layer among the input layer information, and may update the memory management table 111, based on the search result. The neural network computing device 110 may compute the output address for the output data to be output from the k-th layer, based on the updated memory management table 111. In an example embodiment, the neural network computing device 110 may update the memory management table 111 based on the search result.

In operation S130-1, the neural network computing device 110 may store the output data of the k-th layer in the external memory device 120, based on the computed output address. In an example embodiment, when the number of the output data to be output from the k-th layer is 'm' (where 'm' is an integer greater than 1), the neural network computing device 110 may repeatedly perform operations S130 and S130-1 up to 'm' times.

In operation S140, it is determined whether the variable 'k' is a maximum. That is, the neural network computing device 110 may determine whether the computing operation on all of the plurality of layers is completed.

When the variable 'k' is the maximum (i.e., when the computing operation is completed about all of the plurality of layers), the neural network computing device 110 ends the operation. When the variable 'k' is not the maximum, in operation S145, the variable 'k' is incremented by '1', thereafter, the neural network computing device 110 performs operation S120.

As described above, the neural network computing device 110 according to an embodiment of the inventive concept may manage or compute the input address and the output address on the external memory device 120, based on the layer information for each of the plurality of layers and the memory management table 111. Accordingly, although the storage space of the external memory device 120 is limited, the neural network computing device 110 may normally perform the neural network computing operation.

FIG. 5 is a diagram illustrating a memory management table of FIG. 1. The memory management table 111 illustrated in FIG. 5 is an example for easily describing embodiments of the inventive concept, but the scope of the inventive concept is not limited thereto.

Referring to FIGS. 1 and 5, the memory management table 111 may include an edge field, a source field, a target field, a size field, a toggle field, a merge field, and an offset field.

The edge field may indicate information for an edge indicating the connection relationship between the plurality of layers. For example, as described in FIG. 3, the first data DT1 may be the output data with respect to the first computing layer L1 and the input data with respect to the second computing layer L2. That is, it may be understood that the first and second computing layers L1 and L2 are connected by one edge. In other words, in an embodiment of the inventive concept, the edge may indicate the connection relationship (or a data sharing relationship) between specific layers.

In an example embodiment, as the neural network computing device 110 performs the neural network computing operation on the plurality of layers, the number of edges of the memory management table 111 may be increased or decreased. That is, the number of the edges stored in the memory management table 111 at a specific time may mean the number of data stored in the external memory device 120.

The source field and the target field may be set to the layer name or the data name, respectively. In a process of computing the input address, the source field may be set to the layer name on the specific layer, and the target field may be set to the input data name on the specific layer. In the process of computing the output address, the source field may be set to the output data name on the specific layer, and the target field may be set to the layer name on the specific layer.

The size field may indicate information for the size of data corresponding to the edge field.

The toggle field may indicate information for identifying regions of the external memory device 120. For example, when the external memory device 120 is used as a double buffer, the external memory device 120 may be divided into at least two independently accessible regions. In this case, a specific region to be accessed to the external memory device 120 may be determined based on the toggle field. In an example embodiment, the toggle field may be omitted depending on the driving type or structure of the external memory device 120.

Merge information may be information for indicating the edges to be merged among a plurality of edges included in the memory management table 111. As described below, based on the merge information, the plurality of edges included in the memory management table 111 may be merged.

The offset information may be information for indicating a region that becomes blank by merging the plurality of edges.

A more specific configuration of the memory management table 111 described above will be described in more detail with reference to the drawings below.

Figure 6:
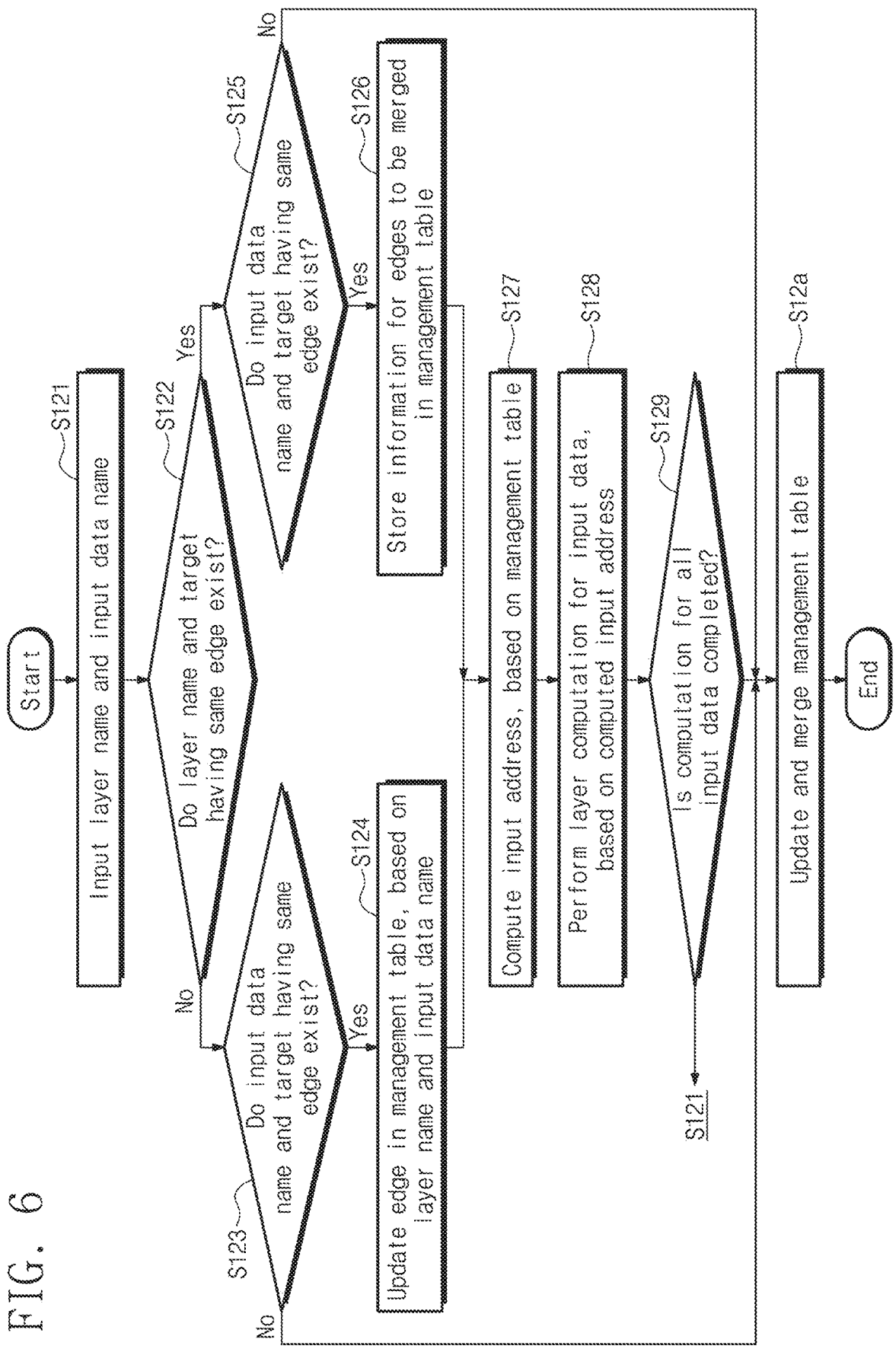
FIG. 6 is a flowchart describing in more detail an operation (i.e., an input address computing operation) of operation S120 of FIG. 4.

FIG. 6 is a flowchart describing in more detail an operation (i.e., an input address computing operation) of operation S120 of FIG. 4. For convenience of description, it is assumed that the neural network computing device 110 performs the computing operation on the first layer L1 (refer to FIG. 3). However, the scope of the inventive concept is not limited thereto, and the neural network computing device 110 may compute the input address in a manner similar to the flowchart illustrated in FIG. 6 for each of the other layers.

For convenience of description, the flowchart of FIG. 6 is described as being performed by the neural network computing device 110, but the scope of the inventive concept is not limited thereto. For example, operations of the flowchart of FIG. 6 may be performed by the address management module 115 or the address computing module 116 of the neural network computing device 110, or by the processor 112 that is configured to execute the address management module 115 or the address computing module 116.

In operation S121, the neural network computing device 110 may receive the layer name and the input data name on the first layer L1. For example, the neural network computing device 110 may identify the layer name and the input data name on the first layer L1 from the layer information described with reference to FIG. 4.

In operation S122, the neural network computing device 110 may determine whether the layer name and the target field of the first layer L1 having the same edge exist. For example, the neural network computing device 110 may scan the target field of the memory management table 111 to determine whether a value identical to the layer name of the first layer L1 exists.

In the memory management table 111, when there is no target field having the same value as the layer name of the first layer L1, in operation S123, the neural network computing device 110 may determine whether the input data name of the first layer and the target field having the same edge exist. For example, the neural network computing device 110 may scan the target field of the memory management table 111 to determine whether the target field identical to the input data name of the first layer L1 exists.

In the memory management table 111, an absence of the target field having the same value as the input data name of the first layer L1 indicates that the input data to be input to the first layer L1 is not stored in the external memory device 120. Therefore, in this case, the neural network computing device 110 ends the operation.

In the memory management table 111, when there is the target field having the same value as the input data name of the first layer L1, in operation S124, the neural network computing device 110 may update the memory management table 111, based on the layer name and the input data name of the first layer L1. For example, it is assumed that an edge at which the input data name and the target field of the first layer L1 are the same is the first edge. In this case, the neural network computing device 110 changes the value of the source field corresponding to the first edge to the input data name of the first layer L1, and changes the value of the target field corresponding to the first edge to the layer name of the first layer L1. That is, that the value of the source field corresponding to the first edge is the input data name of the first layer L1, and the value of the target field corresponding to the first edge is the layer name of the first layer L1 may mean that data stored at an address corresponding to the first edge is the input data to be input to the first layer L1. In an example embodiment, the edge updated through operation S124 may be determined as a base edge described below.

When the determination operation of operation S122 indicates that the target field having the same value as the layer name of the first layer L1 exists in the memory management table 111, the neural network computing device 110 may perform operation S125. Since operation S125 is similar to operation S123, a detailed description thereof will be omitted to avoid redundancy.

When the determination operation of operation S125 indicates that the target field having the same value as the input data name of the first layer L1 does not exist in the memory management table 111, the neural network computing device 110 ends the operation.

When the determination operation of operation S125 indicates that the target field having the same value as the input data name of the first layer L1 exists in the memory management table 111, in operation S126, the neural network computing device 110 may update the memory management table 111, based on the layer name and the input data name of the first computing layer L1. For example, the neural network computing device 110 may update the memory management table 111, similar to operation S124. In an example embodiment, the edge updated through operation S125 may be determined as a merge edge described below.

In addition to this, the neural network computing device 110 may update the merge information. For example, it is assumed that the number of input data to be input to the first layer L1 is two, and the two data correspond to the first edge and a second edge, respectively. The neural network computing device 110 may compute the input address for two input data to be input to the first layer L1 by performing the operation according to the flowchart of FIG. 6 twice. At this time, in a process of the first input address computation, the target field of the first edge will be changed to the layer name of the first layer L1. (i.e., through operations S121, S122, S123, and S124 of FIG. 6). Subsequently, in a process of the second input address computation, since the target field of the first edge is the same as the layer name of the first layer L1, the neural network computing device 110 will perform operations S122, S125, and S126. In this case, the neural network computing device 110 may receive two input data corresponding to the first edge and the second edge. Subsequently, for efficient memory management for the external memory device 120, the first edge and the second edge should be merged with each other. That is, the edge updated in operation S124 may be set as the base edge, and the edge updated in operation S126 may be set as the merge edge. Information about merging edges may be set in the merge field of the memory management table 111.

In operation S127, the neural network computing device 110 may compute the input address, based on the updated memory management table 111. For example, in operation S124 or S126, the neural network computing device 110 may compute the input address, based on information about the updated edge. For example, when the updated edge is 'n'th edge, the input address corresponding to the 'n'th edge may be computed as shown in Equation 1 below.

$$\text{ADDR}[En] = \text{Size}:BF \times TG + \text{Sum}[\text{Size}:E0 \sim n-1] + \text{Sum}[\text{OFS}:E0 \sim n-1] \qquad \text{[Equation 1]}$$

Referring to Equation 1, ADDR [En] indicates an address of the external memory device 120 corresponding to the 'n'th edge. Size: BF indicates a size of a unit buffer of the external memory device 120. For example, when the external memory device 120 has a size of 16 MB and is the double buffer divided into 8 MB, Size: BF may be a value corresponding to 8 MB. TG may be a value of the toggle field corresponding to the 'n'th edge. SUM [Size: E0~n−1] indicates a sum of sizes of each of 0th to (n−1)-th edges. SUM [OFS: E0~n−1] indicates a sum of offsets of each of the 0th to (n−1)-th edges. According to Equation 1 described above, an address of the external memory device 120 corresponding to the 'n'th edge may be computed.

In operation S128, the neural network computing device 110 may read the input data from the external memory device 120, based on the computed input address, and perform the layer computation on the read input data.

In operation S129, the neural network computing device 110 may determine whether the computation for all input data is completed. For example, as described above, the number of the input data for one layer may be plural. In this case, the neural network computing device 110 may perform the input address computing operation according to the flowchart of FIG. 6 a plurality of times. When the operation on all input data is not complete (i.e., when there is uncomputed input data), the neural network computing device 110 may perform operation S121. In this case, the input data name will be changed to the name for the uncomputed input data.

When the computation on all input data is completed, the neural network computing device 110 may perform operation S12a. Operation S12a will be described in detail with reference to FIG. 7.

Figure 7:
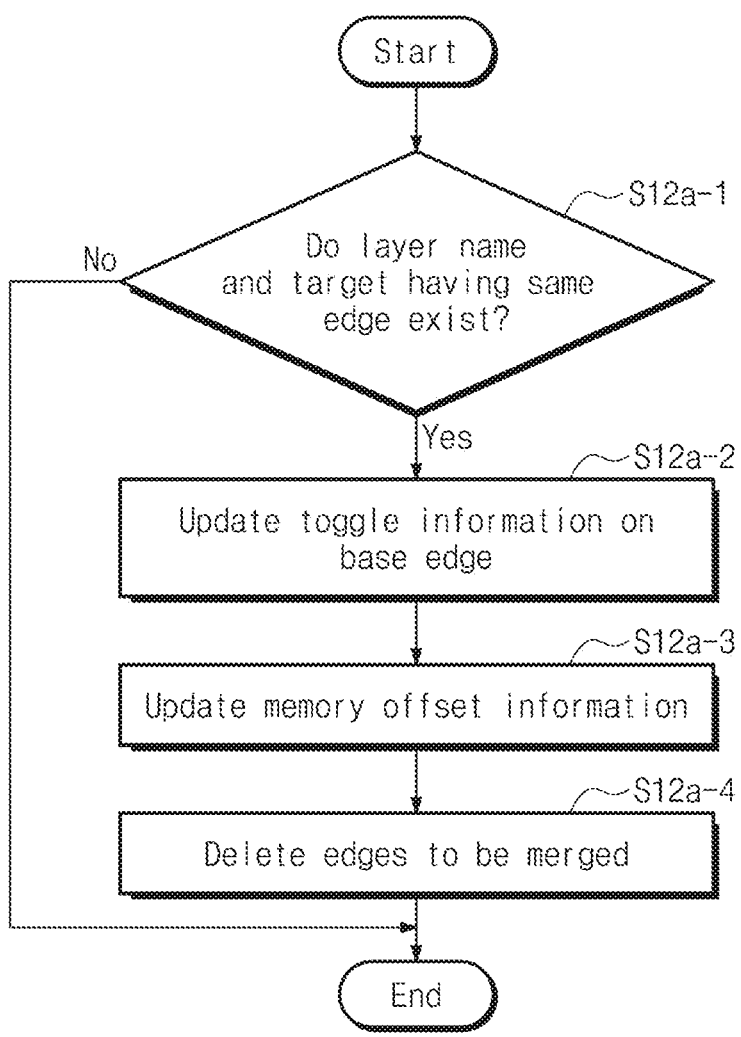
FIG. 7 is a flowchart describing an operation of operation S12a of FIG. 6.

FIG. 7 is a flowchart describing an operation of operation S12a of FIG. 6. Referring to FIGS. 1, 6, and 7, the neural network computing device 110 may update or merge the memory management table 111 through operations S12a-1 to S12a-4. For convenience of description, likewise, the above description, the following operations will be described with reference to the first layer L1.

For example, in operation S12a-1, the neural network computing device 110 may search for a target field that is the same as the layer name. For example, the neural network computing device 110 may scan the memory management table 111 and then search for the target field that is the same as the layer name of the first layer L1.

That the same target field as the layer name of the first layer L1 does not exist, may mean that there is no edge updated through operations S124 and S126 described with reference to FIG. 6. In this case, the neural network computing device 110 may end the operation.

When there is the target field that is the same as the layer name of the first layer L1, in operation S12*a*-2, the neural network computing device 110 may update the toggle field of the base edge. For example, as described above, in operations S124 and S126 of FIG. 6, the merge information corresponding to the searched edges may be updated. In this case, the searched edges may be the base edge or the merge edge. Since the base edge is an edge to be maintained, by updating the toggle field, the position of the base edge in the external memory device 120 may be changed. In an example embodiment, when the external memory device 120 is not a multi-buffer, an operation for updating the toggle field may be omitted to avoid redundancy.

In operation S12*a*-3, the neural network computing device 110 may update the offset field. In operation S12*a*-4, the neural network computing device 110 may delete the edges to be merged.

For example, it is assumed that the edge field, the merge field, and the offset field included in the memory management table 111 are updated as shown in Table 1, in the input address computing process of the first layer L1. For convenience of description, only some information of the memory management table 111 is described in Table 1.

TABLE 1

| edge | E0 | E1 | E2 | E3 | E4 | E5 | E6 | E7 | E8 |
|---|---|---|---|---|---|---|---|---|---|
| merge | T | T(b) | — | T | T | — | — | T | — |
| offset | — | — | 1 | — | — | 2 | — | — | 1 |

Referring to Table 1, the first edge E1 may be the base edge, and the zeroth, third, fourth, and seventh edges E0, E3, E4, and E7 may be merge edges (i.e., edges to be merged). In this case, after the input address computation on all input data of the first layer L1 is completed, the merge edges (i.e., E0 E3, E4, and E7) are deleted, and only the base edge (i.e., E1) will remain. In this case, as the merge edges are deleted, the address may not be correctly computed when address computing of other edges (e.g., E2, E5, and E8). To prevent this, the offset field may be set. For example, the offset field on the second edge E2 may be set to "1". This means that the size of the edge (i.e., E0) deleted by the merge among the edges before the second edge E2 is "1". Alternatively, the offset field for the fifth edge E5 may be set to "2". This means that the size of the edges (i.e., E3 and E4) deleted by the merge among the edges between the second and fifth edges E2 and E5 is "2". That is, as the size of the edges deleted by the merge is set in the offset field of remaining edges, subsequent address computation may be performed correctly.

As described above, as the neural network computing device 110 according to an embodiment of the inventive concept computes the input address, based on the layer information of the specific layer and the memory management table 111, even though the external memory device 120 has a limited size, the neural network computing device 110 may normally process the input data and the output data.

Figure 8:
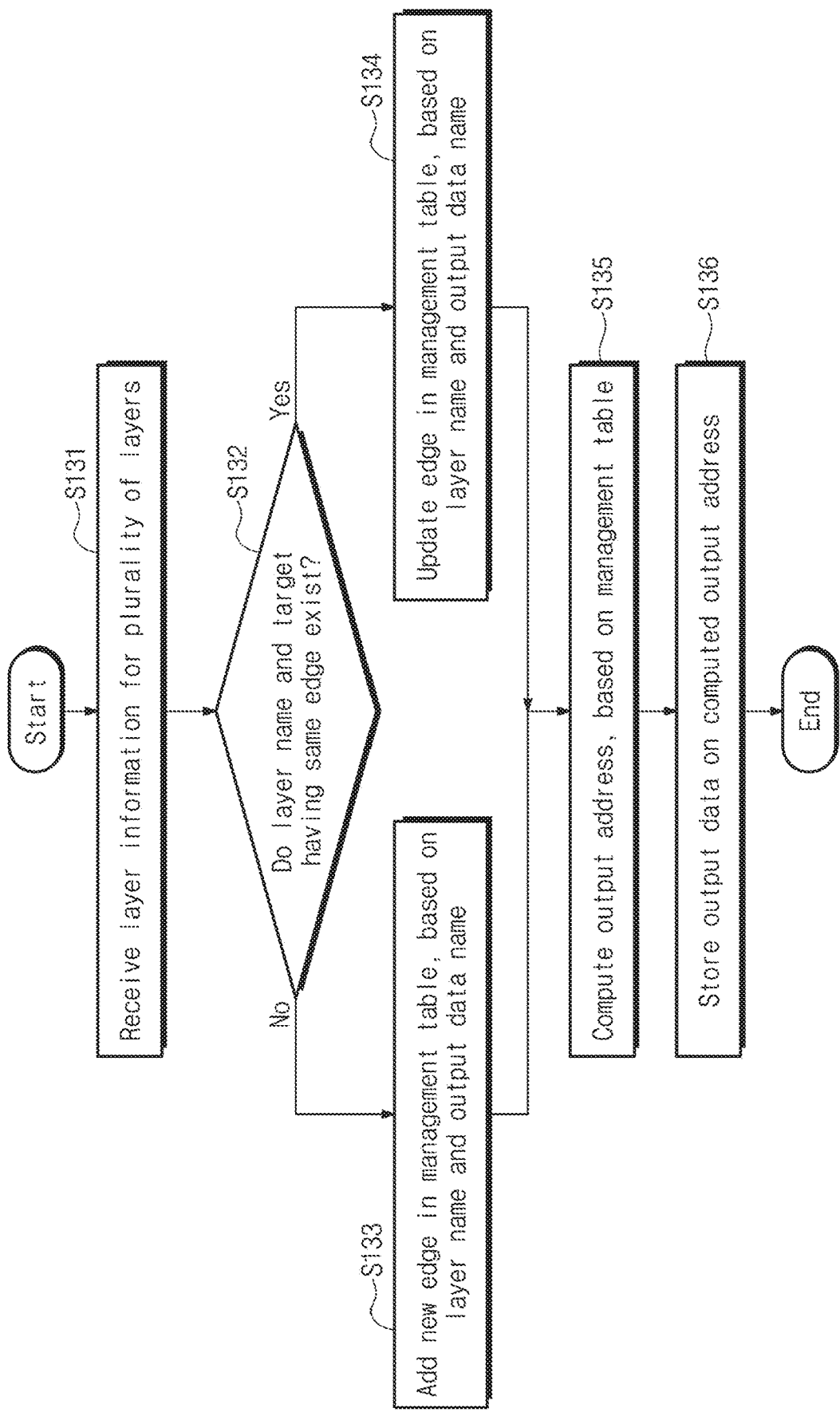
FIG. 8 is a flowchart describing an operation (i.e., an output address computing operation) of operation S130 of FIG. 4.

FIG. 8 is a flowchart describing an operation (i.e., an output address computing operation) of operation S130 of FIG. 4. Likewise, as described with reference to FIGS. 6 and 7, for convenience of description, an operation according to the flowchart of FIG. 8 will be described with reference to the first layer L1.

Referring to FIGS. 1, 3, and 8, in operation S131, the neural network computing device 110 may receive the layer name and the output data name for the first layer L1. For example, the neural network computing device 110 may identify the layer name and the output data name for the first layer L1 from the layer information described with reference to FIG. 4.

In operation S132, the neural network computing device 110 may search for an edge having the same target field as the layer name of the first layer L1. For example, the neural network computing device 110 may scan the memory management table 111 and search for the target field that is the same as a layer name of the first layer L1.

When the same target field as the layer name of the first layer L1 does not exist, in operation S133, the neural network computing device 110 may add a new edge in the memory management table 111, based on the layer name and the output data name of the first layer L1. The source field of the new edge may be the layer name of the first layer L1, and the target field of the new edge may be the output data name.

When the same target field as the layer name of the first layer L1 exists, in operation S134, the neural network computing device 110 may update the memory management table 111, based on the layer name and output data name of the first layer L1. For example, it is assumed that the first edge corresponds to the target field that is the same as the layer name of the first layer L1. In this case, the neural network computing device 110 may change the source field of the first edge to the layer name of the first layer L1, and change the target field of the first edge to the output data name of the first layer L1.

In operation S135, the neural network computing device 110 may compute the output address, based on the memory management table 111. For example, the neural network computing device 110 may compute the output address, based on information corresponding to the newly added edge in operation S133 or information on the edge updated in operation S134. Since the computing method of the output address is similar to the input address computation described with reference to Equation 1, a detailed description thereof is omitted to avoid redundancy.

In operation S136, the neural network computing device 110 may store the output data in the external memory device 120, based on the computed output address.

In an example embodiment, when the number of the output data of the first layer L1 is 'm' (where 'm' is an integer greater than '2'), the neural network computing device 110 may perform the computing operation of the output address according to the flowchart of FIG. 8 by 'm' times.

As described above, the neural network computing device 110 according to an embodiment of the inventive concept may compute the input address and the output address for the external memory device 120, based on the layer information of each of the plurality of layers and the memory management table 111. That is, since the neural network computing device 110 may dynamically allocate regions of the external memory device 120 with regard to each of the plurality of layers, even though the storage space of the external memory device 120 is limited, the neural network computing operation may be normally performed.

FIGS. 9 and 10A to 10I are diagrams describing a memory address computing operation or a memory region allocation operation of a neural network computing device according to an embodiment of the inventive concept. For convenience of description, components unnecessary for describing the technical features of the inventive concept are omitted to avoid redundancy.

Figure 9:
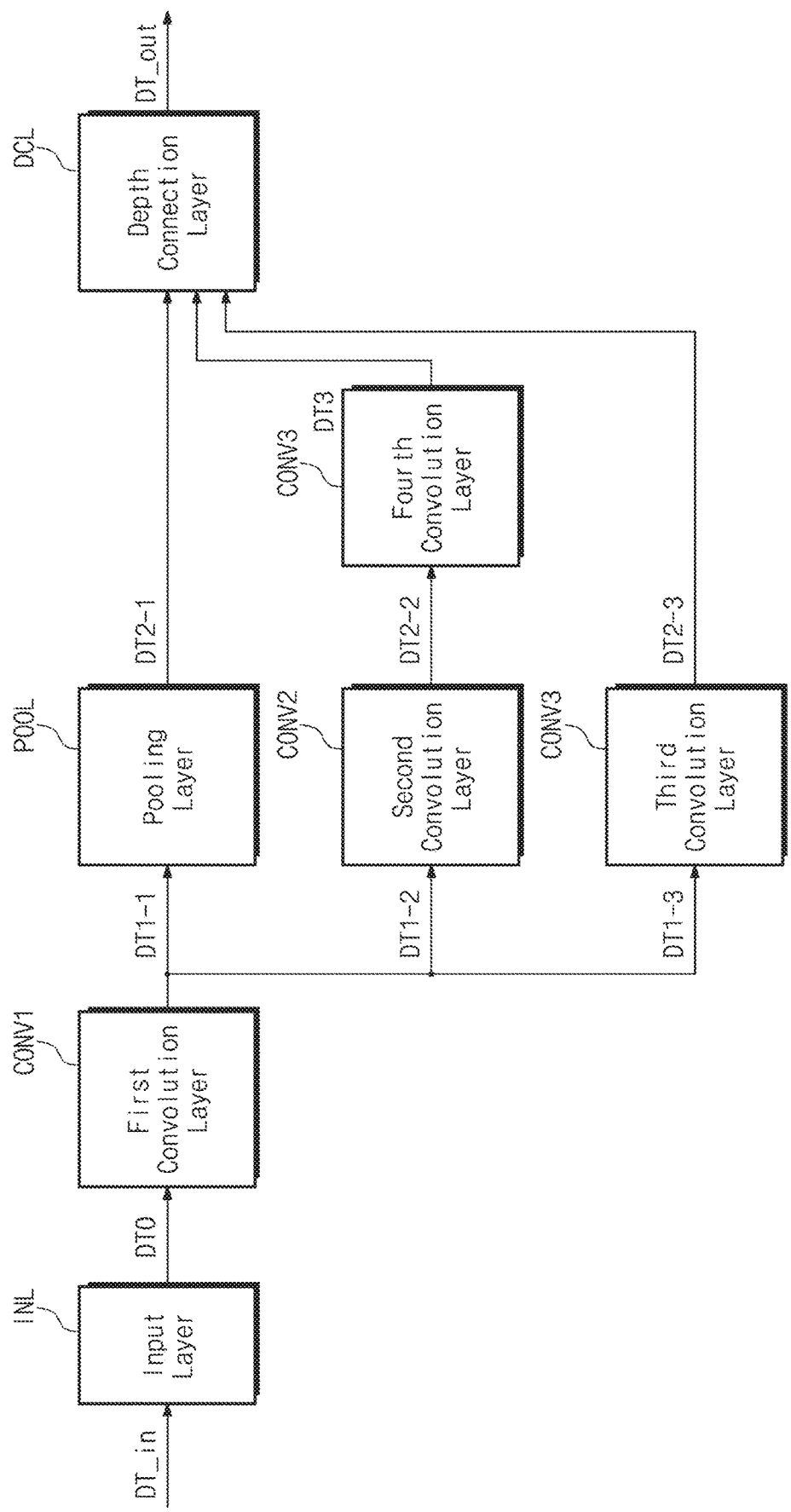

Referring to FIGS. 1 and 9, the neural network computing device 110 may perform the neural network computing operation by performing an input layer INL, first to fourth convolution layers CONV1 to CONV4, a pooling layer POOL, and a depth connection layer DCL, sequentially or in parallel, The input layer INL may receive input data DT in and output zeroth data DT0, based on the received input data DT in. The zeroth data DT0 may be provided as the input data of the first convolution layer CONV1.

The first convolution layer CONV1 may receive the zeroth data DT0 and perform the computation on the received zeroth data DT0 to output three data DT1-1, DT1-2, and DT1-3. The three data DT1-1, DT1-2, and DT1-3 may be provided as the input data of the pooling layer POOL, the second convolution layer CONV2, and the third convolution layer CONV3, respectively.

The pooling layer POOL may receive the data DT1-1 and perform the computation on the received data DT1-1 to output data DT2-1. The output data DT2-1 may be provided as the input data of the depth connection layer DCL.

The second convolution layer CONV2 may receive the data DT1-2 and perform the computation on the received data DT1-2 to output data DT2-2. The output data DT2-2 may be provided as the input data of the fourth convolution layer CONV4.

The third convolution layer CONV3 may receive the data DT1-3, perform the computation on the received data DT1-3 to output data DT2-3. The output data DT2-3 may be provided as the input data of the depth connection layer DCL.

The fourth convolution layer CONV4 may receive the data DT2-2 and perform the computation on the received data DT2-2 to output third data DT3. The third data DT3 may be provided as the input data of the depth connection layer DCL.

The depth connection layer DCL may receive the data DT2-1, DT3, and DT2-3, and perform the computation on the received data DT2-1, DT3, DT2-3 to output output data DT_out.

The various data DT0, DT1-1, DT1-2, DT1-3, DT2-1, DT2-2, DT2-3, and DT3 described above may be stored in the external memory device 120. At this time, the position where each data is stored may be determined by the above-described input address computation and output address computation. That is, although the total storage space of the external memory device 120 is less than the entire size of the data DT0, DT1-1, DT1-2, DT1-3, DT2-1, DT2-2, DT2-3, and DT3, the neural network computing device 110 may normally output the output data DT_out.

Hereinafter, a process in which the input address computation and the output address computation at each of the plurality of layers of FIG. 9 are performed will be described with reference to FIGS. 10A to 10I. For convenience of description, it is assumed that the external memory device 120 has a double buffer structure and a buffer unit is '8'.

First, referring to FIG. 10A, in the input layer INL, the output address computation operation may be performed. In this case, information about the zeroth edge E0 may be added to the memory management table 111 by the output address computation operation of the neural network computing device 110. For example, in an initial operation, it is assumed that the memory management table 111 is empty. In this case, as described with reference to FIG. 8, when the input address about the input layer INL is computed, since the target field identical to the layer name of the input layer INL does not exist in the memory management table 111, information about the zeroth edge E0 that has the layer name (i.e., INL) and the input data name (i.e., DT0) of the input layer INL as the source field and the target field, respectively, is added to the memory management table 111. The source field may be 'INL', the target field is 'DT0', the size field is '4', and the toggle field may be '0', with regard to the added zeroth edge E0.

The neural network computing device 110 may compute the output address according to Equation 1, based on the added information about the zeroth edge E0. In this case, the computed output address may be a zeroth address [A0]. The neural network computing device 110 may store the zeroth data DT0 in a region corresponding to the computed output address [A0].

Figure 10B:
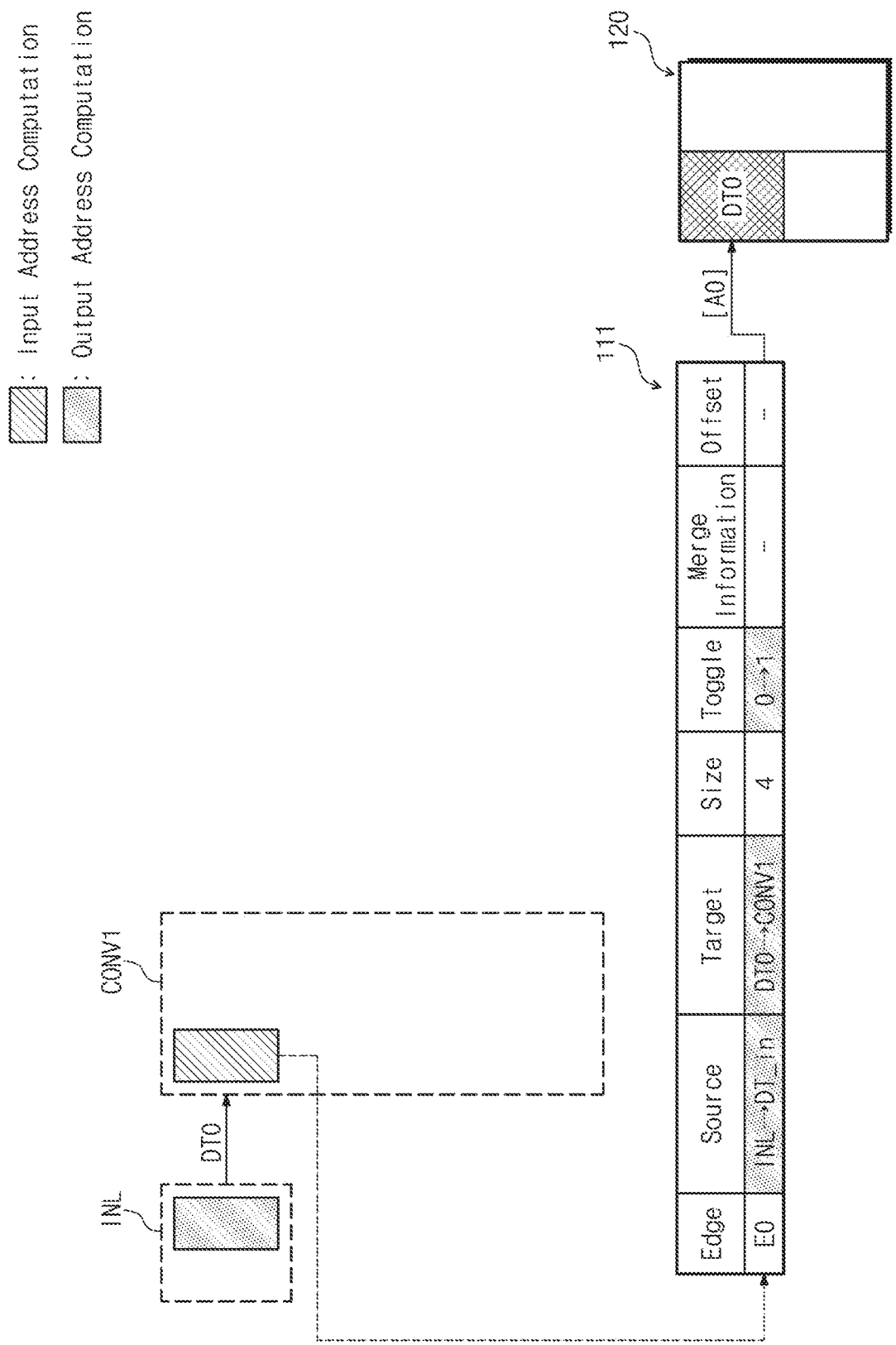

Subsequently, referring to FIG. 10B, in the first convolution layer CONV1, the input address computation operation may be performed. In this case, information corresponding to the zeroth edge E0 may be updated in the memory management table 111 by the input address computing operation of the neural network computing device 110. For example, as described with reference to FIG. 4, since there is the target field that has the same value as the input data name (i.e., DT0) of the first convolution layer CONV1 in the memory management table 111, the source field of the corresponding zeroth edge E0 may be changed to the input data name of the first convolution layer CONV1 (i.e., DT0), and the target field of the zeroth edge E0 may be changed to the layer name (i.e., CONV1) of the first convolution layer CONV1.

The neural network computing device 110 may compute the input address according to Equation 1, based on the updated information about the zeroth edge E0. In this case, the computed input address may be the zeroth address [A0]. The neural network computing device 110 may read the zeroth data DT0 from a region corresponding to the computed output address [A0].

Afterwards, the neural network computing device 110 may update or merge the memory management table 111 as described with reference to FIG. 7. According to the flowchart of FIG. 7, the toggle field of the zeroth edge E0 may be changed to "1". In an example embodiment, since the number of the input data of the first convolution layer CONV1 is "1", a configuration for setting the merge information may be omitted to avoid redundancy.

Figure 10C:
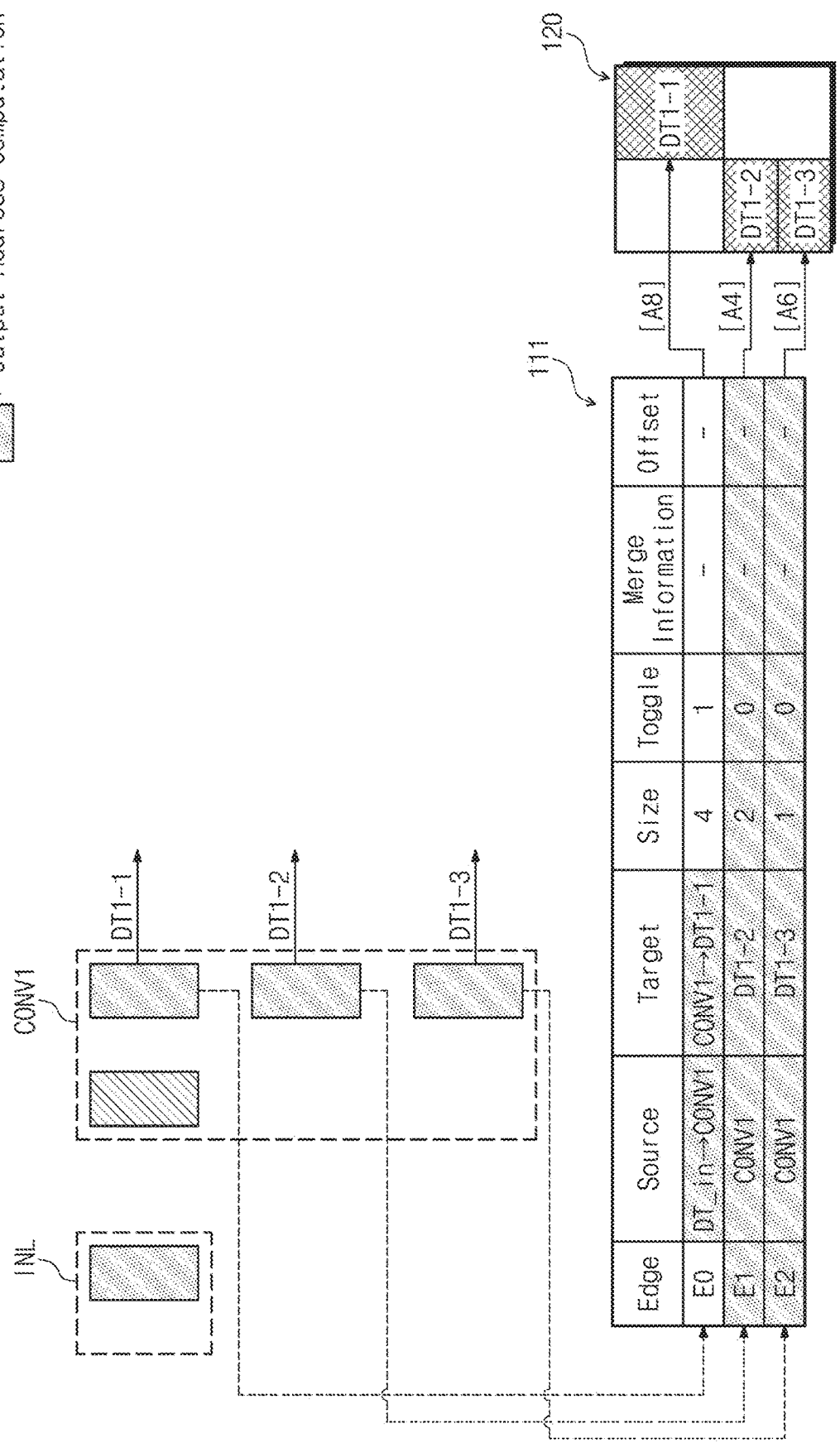

Subsequently, referring to FIG. 10C, in the first convolution layer CONV1, the output address computing operation may be performed. As described with reference to FIG. 9, the data output from the first convolution layer CONV1 may be three. That is, the neural network computing device 110 may repeatedly perform the output address computing operation described with reference to FIG. 8 up to three times.

For example, the neural network computing device 110 may perform the output address computing operation on the output data DT1-1 of the first convolution layer CONV1. As described with reference to FIG. 8, since the target field identical to the layer name (i.e., CONV1) of the first convolution layer CONV1 exists, information of the corresponding zeroth edge E0 may be updated. In this case, the source field of the zeroth edge E0 may be changed to the layer name CONV1 of the first convolution layer CONV1, and the target field may be changed to the name (i.e., DT1-1) of the output data. The neural network computing device 110 may compute the output address according to Equation 1, based on the updated information about the zeroth edge E0. In this case, the computed output address may be an eighth address [A8]. The neural network computing device 110 may store the data DT1-1 in a region corresponding to the eighth address [A8] of the external memory device 120.

Afterwards, the neural network computing device 110 may perform the output address computing operation for the output data DT1-2 of the first convolution layer CONV1. In this case, as described with reference to FIG. 8, since there is no the target field that is the same as the layer name (i.e., CONV1) of the first convolution layer CONV1 (this means that the information about the zeroth edge E0 is previously updated.), the neural network computing device 110 may add information about the new edge (i.e., the first edge E1). For the first edge E1, the source field may be the layer name (i.e., CONV1) of the first convolution layer CONV1, and the target field may be the name of the output data (i.e., DT1-2) of the first convolution layer CONV1, the size field may be "2", and the toggle field may be "0".

The neural network computing device 110 may compute the output address according to Equation 1, based on the added information about the first edge E1. In this case, the computed output address may be a fourth address [A4]. The neural network computing device 110 may store the data DT1-2 in a region corresponding to the fourth address [A4] of the external memory device 120.

Thereafter, the neural network computing device 110 may compute the output address about the output data DT1-3 of the first convolution layer CONV1. Since this is similar to the output address computation for the output data DT1-2 described above, a detailed description thereof will be omitted to avoid redundancy. Accordingly, information about the second edge E2 corresponding to the output data DT1-3 may be added in the memory management table 111. For the added second edge E2, the source field may be the layer name (i.e., CONV1) of the first convolution layer CONV1, and the target field may be the output data name (i.e., DT1-3) of the first convolution layer (CONV1), the size field may be "1", and the toggle field may be "0". The neural network computing device 110 may compute the output address according to Equation 1, based on the added information about the second edge E2. In this case, the computed output address may be a sixth address [A6]. The neural network computing device 110 may store the data DT1-3 in a region corresponding to the sixth address [A6] of the external memory device 120.

Figure 10D:
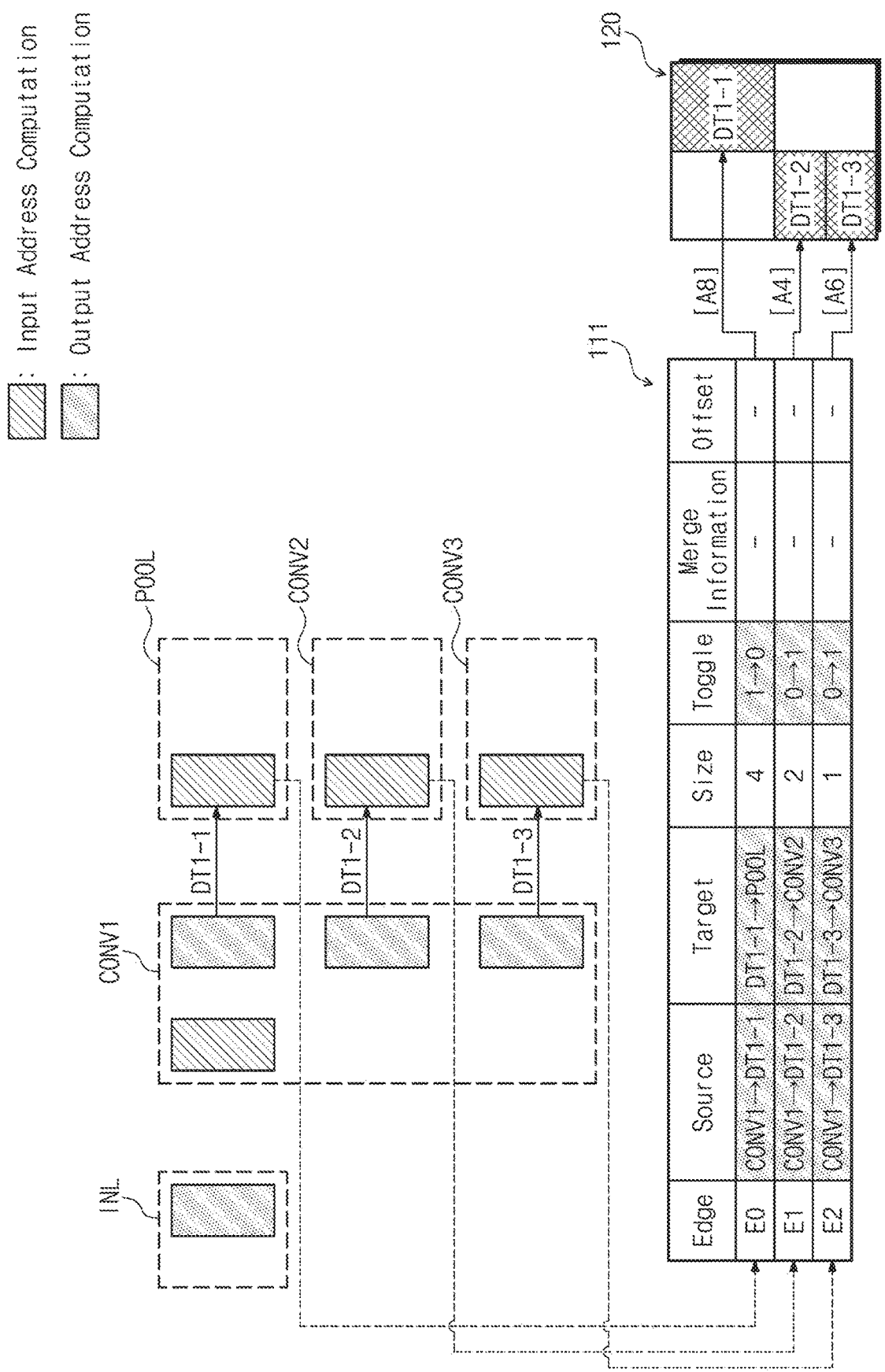

Subsequently, referring to FIG. 10D, in the pooling layer POOL, the input address computation operation may be performed. In this case, information about the zeroth edge E0 of the memory management table 111 may be updated by the input address computation operation of the neural network computing device 110. For example, as described with reference to FIG. 4, since the same target field as the input data name (i.e., DT1-1) of the pooling layer POOL exists in the memory management table 111, the source field of the corresponding zeroth edge E0 may be changed to the input data name (i.e., DT1-1) of the pooling layer POOL, and the target field may be changed to the layer name (i.e., POOL) of the pooling layer POOL. The neural network computing device 110 may compute the input address according to Equation 1, based on the updated information about the zeroth edge E0. In this case, the computed input address may be the eighth address [A8]. The neural network computing device 110 may read the input data DT1-1 from a region corresponding to the computed input address [A8] of the external memory device 120.

The neural network computing device 110 may perform the input address computing operation in the second convolution layer CONV2 and the third convolution layer CONV3, respectively. Since the input address computing operation in each of the second convolution layer CONV2 and the third convolution layer CONV3 is similar to the input address computing operation in the pooling layer POOL described above, a detailed description thereof is omitted to avoid redundancy.

In the input address computing operation of the second convolution layer CONV2, information of the first edge E1 may be updated. For the updated first edge E1, the source field is changed to the input data name (i.e., DT1-2) of the second convolution layer CONV2, and the target field is changed to the layer name (i.e., CONV2) of the second convolution layer CONV2. The neural network computing device 110 may compute the input address according to Equation 1, based on the updated information of the first edge E1. In this case, the computed input address may be the fourth address [A4]. The neural network computing device 110 may read the input data DT1-2 from a region corresponding to the fourth address [A4] of the external memory device 120.

In the input address computing operation of the third convolution layer CONV3, information of the second edge E2 may be updated. For the updated second edge E2, the source field is changed to the input data name (i.e., DT1-3) of the third convolution layer CONV3, and the target field is changed to the layer name (i.e., CONV3) of the third convolution layer CONV3. The neural network computing device 110 may compute the input address according to Equation 1, based on the updated information of the second edge E2. In this case, the computed input address may be the sixth address [A6]. The neural network computing device 110 may read the input data DT1-3 from a region corresponding to the sixth address [A6] of the external memory device 120.

Afterwards, the neural network computing device 110 may update or merge the memory management table 111 as described with reference to FIG. 7. Accordingly, the toggle field of the zeroth edge E0 is changed to "0", the toggle field of the first edge E1 is changed to "1", and the toggle field of the second edge E2 is changed to "1".

Figure 10E:
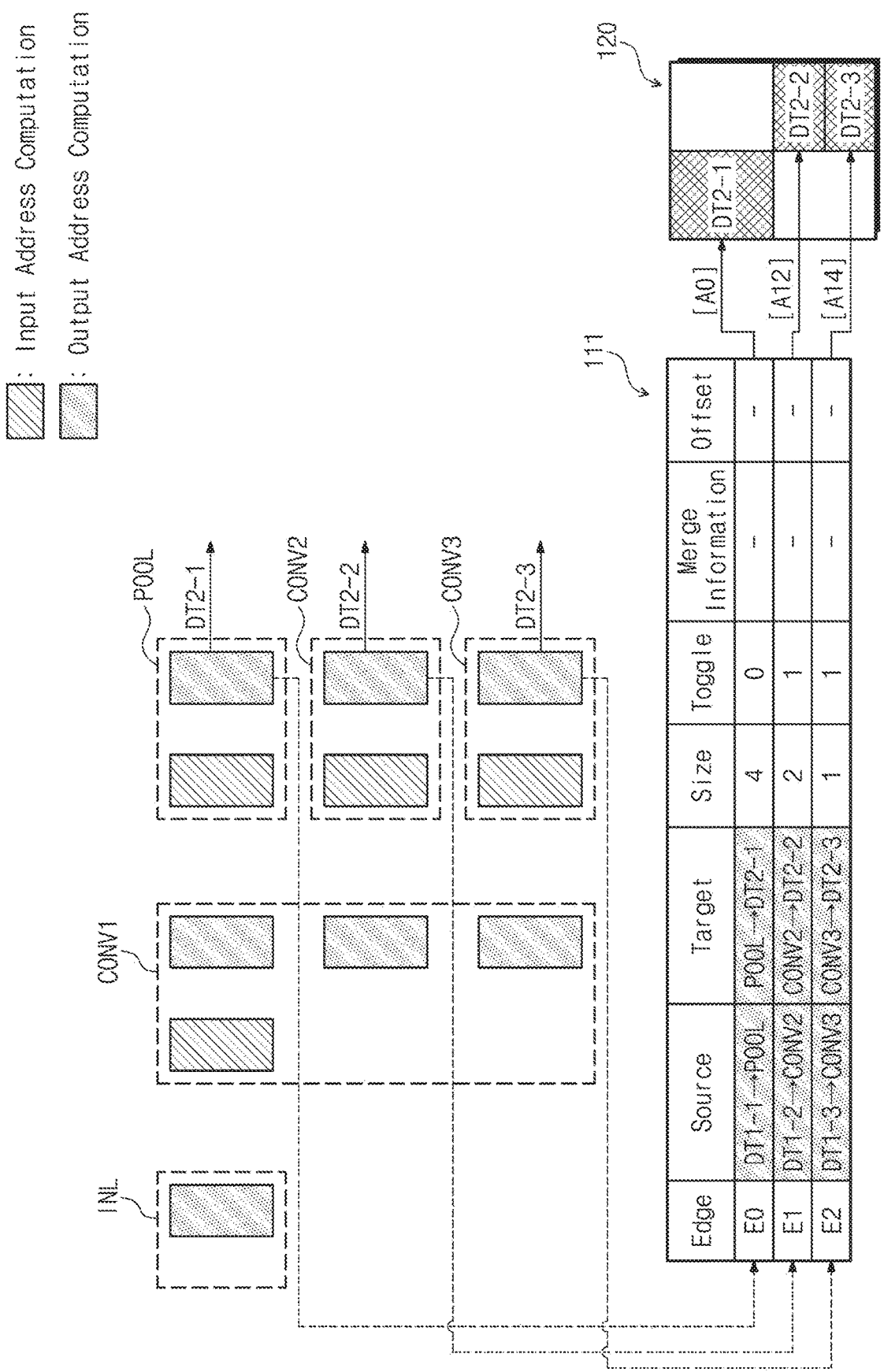

Subsequently, referring to FIG. 10E, the output address computing operation may be performed in each of the pooling layer POOL, the second convolution layer CONV2, and the third convolution layer CONV3. Since the output address computing operation in each of the pooling layer POOL, the second convolution layer CONV2, and the third convolution layer CONV3 is similar to the output address computing operation in the input layer INL and the first convolution layer CONV1 described above, a detailed description thereof is omitted to avoid redundancy.

Information about the zeroth edge E0 may be updated by the output address computing operation in the pooling layer POOL in the memory management table 111. For the updated zeroth edge E0, the source field is changed to the layer name (i.e., POOL) of the pooling layer POOL, and target field is changed to the output data name (i.e., DT2-1) of the pooling layer POOL. The neural network computing device 110 may compute the output address, based on the updated information of the zeroth edge E0. In this case, the computed output address may be the zeroth address [A0]. The neural network computing device 110 may store the output data DT2-1 in a region corresponding to the zeroth address [A0] of the external memory device 120.

In the memory management table 111, information about the first edge E1 may be updated by the output address computing operation in the second convolution layer CONV2. For the updated first edge E1, the source field is changed to the layer name (i.e., CONV2) of the second convolution layer CONV2, and the target field is changed to the output data name (i.e., DT2-2) of the second convolution layer CONV2. The neural network computing device 110 may compute the output address, based on the updated information of the first edge E1. In this case, the computed output address may be a twelfth address [A12]. The neural network computing device 110 may store the output data DT2-2 in a region corresponding to the twelfth address [A12] of the external memory device 120.

Likewise, in the memory management table 111, information about the second edge E2 may be updated by the output address computing operation in the third convolution layer CONV3. For the updated second edge E2, the source field is changed to the layer name (i.e., CONV3) of the third convolution layer CONV3, and the target field is changed to the output data name (i.e., DT2-3) of the third convolution layer CONV3. The neural network computing device 110 may compute the output address, based on the updated information of the second edge E2. In this case, the computed output address may be a fourteenth address [A14]. The neural network computing device 110 may store the output data DT2-3 in a region corresponding to the fourteenth address [A14] of the external memory device 120.

Figure 10F:
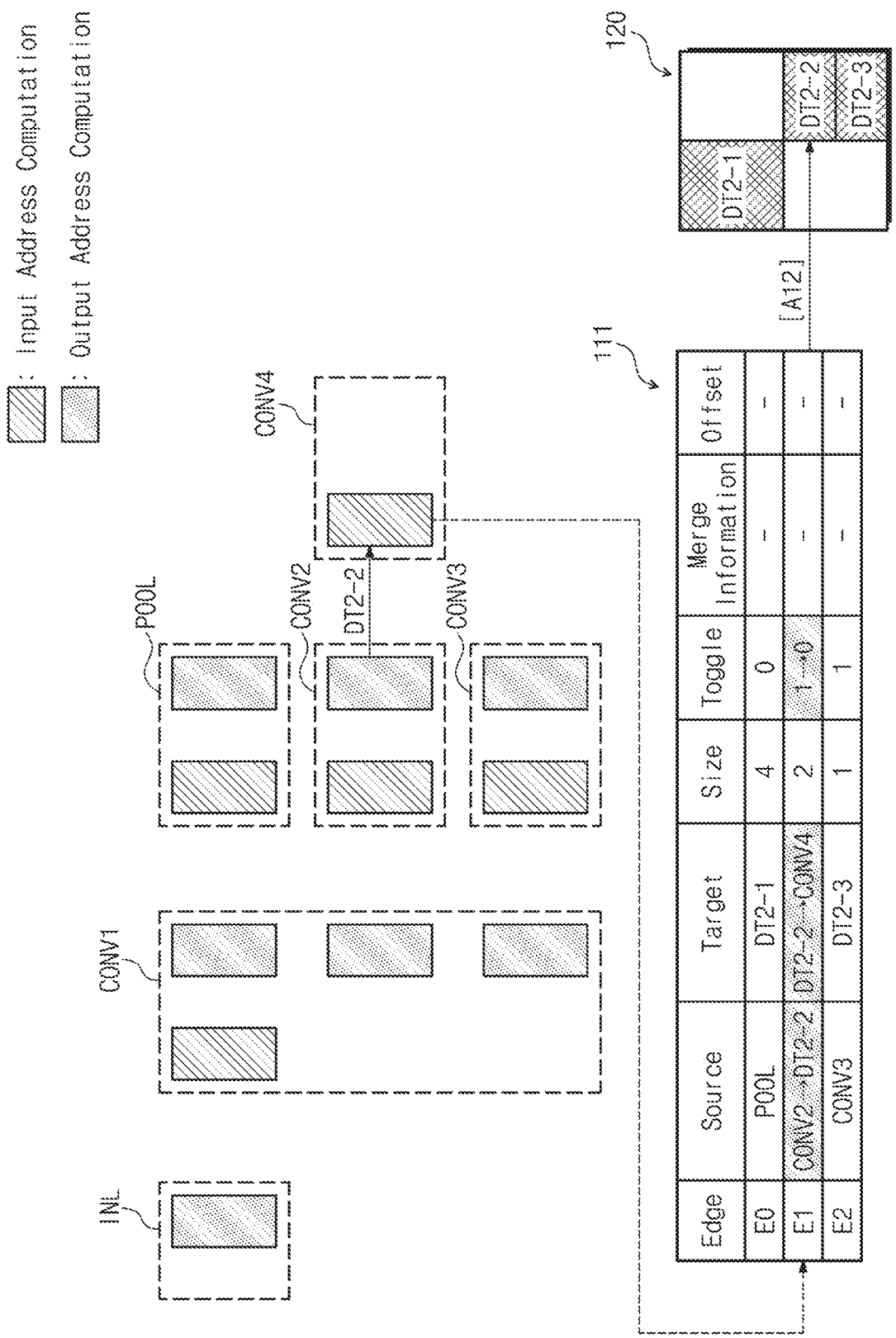

Subsequently, referring to FIG. 10F, in the fourth convolution layer CONV4, the input address computing operation may be performed. Since this is similar to the input address computing operation in the input layer INL and the first convolution layer CONV1 described above, a detailed description thereof is omitted to avoid redundancy.

Information corresponding to the first edge E1 in the memory management table 111 may be updated by the input address computing operation in the fourth convolution layer CONV4. For the updated first edge E1, the source field is changed to the output data name DT2-2 of the fourth convolution layer CONV4, and the target field is changed to the layer name (i.e., CONV4) of the fourth convolution layer CONV4. The neural network computing device 110 may compute the input address according to Equation 1, based on the updated information about the first edge E1. In this case, the computed input address may be the twelfth address [A12]. The neural network computing device 110 may read the input data DT2-2 from a region corresponding to the input address [A12] of the external memory device 120.

Thereafter, the neural network computing device 110 may update or merge the memory management table 111, as described with reference to FIG. 7, whereby the toggle field of the second edge E2 may be changed to "0".

Figure 10G:
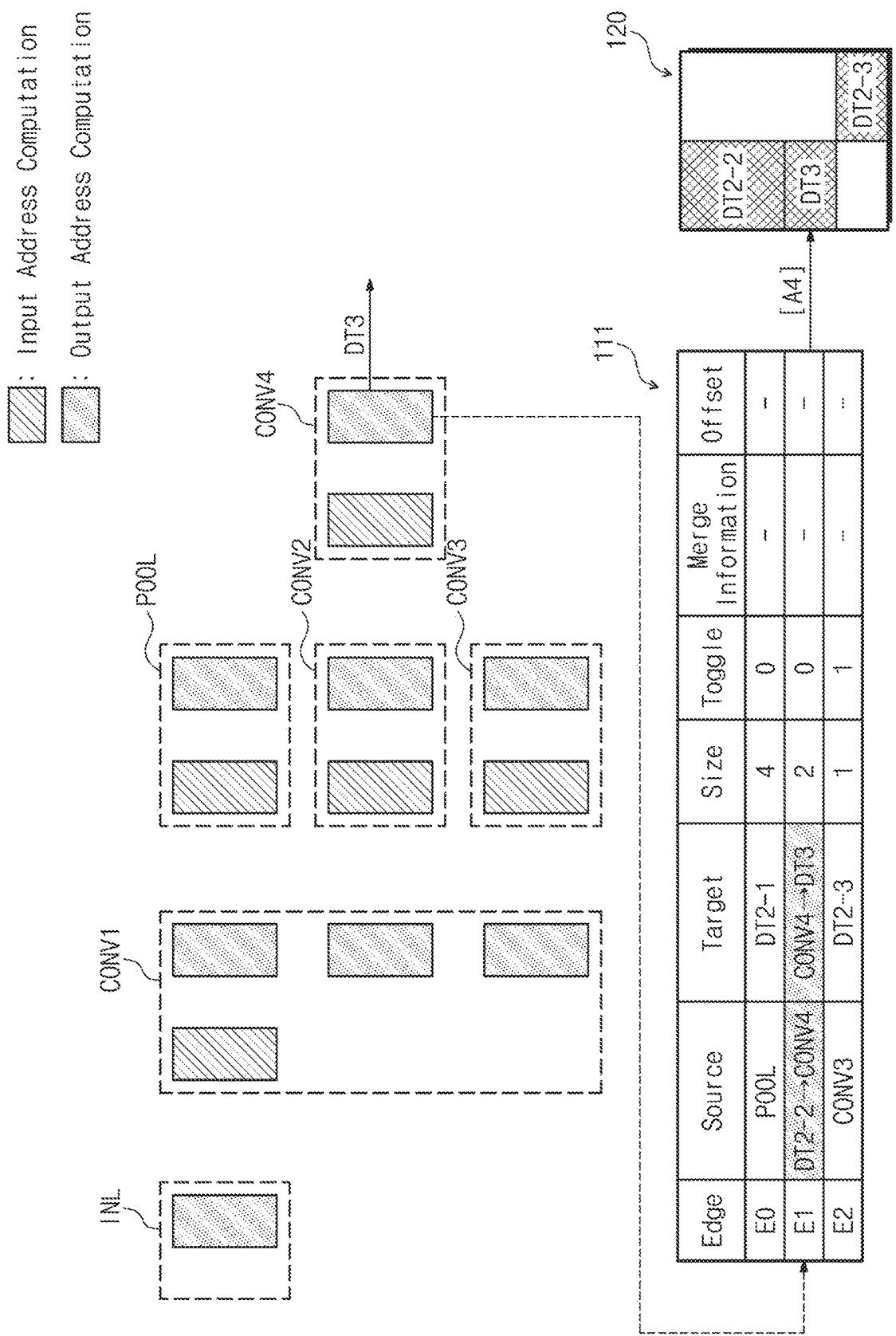

Subsequently, referring to FIG. 10G, in the fourth convolution layer CONV4, the output address computing operation may be performed. Since this is similar to the output address computing operation in each layer described above, a detailed description thereof is omitted to avoid redundancy.

Information about the first edge E1 may be updated by the output address computation in the fourth convolution layer CONV4. For the updated first edge E1, the source field is changed to the layer name (i.e., CONV4) of the fourth convolution layer CONV4, and the target field is changed to the output data name (i.e., DT3) of the fourth convolution layer CONV4. The neural network computing device 110 may compute the output address according to Equation 1, based on the updated information about the first edge E1. In this case, the computed output address may be the fourth address [A4]. The neural network computing device 110 may store the output data DT3 in a region corresponding to the output address [A4] of the external memory device 120.

Figure 10H:
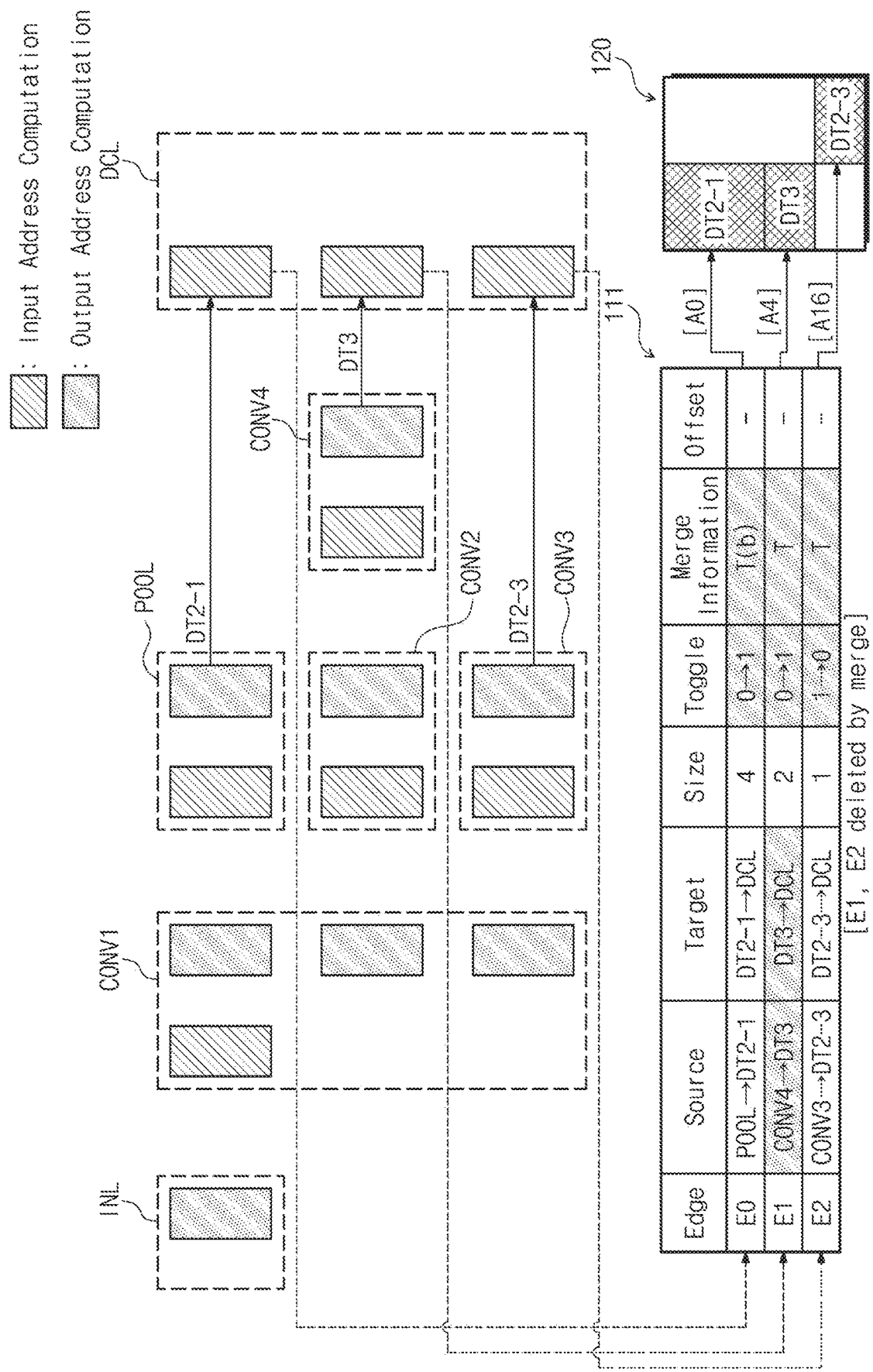

Subsequently, referring to FIG. 10H, in the depth connection layer DCL, the input address computing operation may be performed. For example, the input data of the depth connection layer DCL may be three (i.e., DT2-1, DT3, and DT2-3). As described with reference to FIG. 6, the neural network computing device 110 may perform the input address computing operation for each input data.

First, the neural network computing device 110 may perform the input address computing operation on the input data DT2-1 of the depth connection layer DCL. As described with reference to FIG. 6, in the memory management table 111, since there is no target field identical to the layer name of the depth connection layer DCL, information about the zeroth edge E0 that has the same target field as the input data DT2-1 of the depth connection layer DCL is updated. The source field of the updated zeroth edge E0 is changed to the input data name (i.e., DT2-1) of the depth connection layer DCL, and the target field is changed to the layer name (i.e., DCL) of the depth connection layer DCL. In addition, since the input data of the depth connection layer DCL are plural, the zeroth edge E0 that is searched for the first time in the input address computing operation in the depth connection layer DCL may be set as the base edge. Accordingly, the merge field of the updated zeroth edge E0 may be set to "T (b)". This means that the zeroth edge E0 is the base edge. In an example embodiment, the input address computing operation on the input data DT2-1 of the depth connection layer DCL described above is performed through operations S122, S123, and S124 of FIG. 6.

The neural network computing device 110 may compute the input address according to Equation 1, based on the updated information of the zeroth edge E0. In this case, the computed input address may be the zeroth address [A0]. The neural network computing device 110 may read the input data DT2-1 from a region corresponding to the zeroth address [A0] of the external memory device 120.

Subsequently, the neural network computing device 110 may perform the input address computing operation on the input data DT3 of the depth connection layer DCL. Likewise as described above, information about the first edge E1 may be updated by the input address computing operation on the input data DT3 of the depth connection layer DCL. For the updated first edge E1, the source field is changed to the input data name (i.e., DT3) of the depth connection layer DCL, and the target field is changed to the layer name (i.e., DCL) of the depth connection layer DCL. In this case, unlike the previous input address computing operation on the input data DT2-1, since there is a target field that is the same as the layer name of the depth connection layer DCL in the memory management table 111 (since information on the zeroth edge E0 was previously updated), the merge field of the first edge E1 is set to "T". This indicates that the first edge E1 is an edge to be merged later. In an example embodiment, the input address computing operation on the input data DT3 of the depth connection layer DCL described above is performed through operations S122, S125, and S126 of FIG. 6.

The neural network computing device 110 may compute the input address according to Equation 1, based on the updated information of the first edge E1. In this case, the computed input address may be the fourth address [A4]. The neural network computing device 110 may read the input data DT3 from a region corresponding to the fourth address [A4] of the external memory device 120.

Subsequently, the neural network computing device 110 may perform the input address computing operation on the input data DT2-3 of the depth connection layer DCL. Since this is similar to the input address computing operation on the input data DT3 described above, a detailed description thereof is omitted to avoid redundancy.

Information of the second edge E2 may be updated by the input address computing operation on the input data DT2-3 of the depth connection layer DCL. For the updated second edge E2, the source field is changed to the input data name (i.e., DT2-3) of the depth connection layer DCL, the target field is changed to the layer name (i.e., DCL) of the depth connection layer DCL, and the merge field is set to "T". The neural network computing device 110 may compute the input address according to Equation 1, based on the updated information of the second edge E2. In this case, the computed input address may be the sixteenth address [A16]. The neural network computing device 110 may read the input data DT2-3 from a region corresponding to the sixteenth address [A16] of the external memory device 120.

Thereafter, the neural network computing device 110 may update or merge the memory management table 111. For example, as described with reference to FIG. 7, the neural network computing device 110 may change the toggle field of the zeroth edge E0 that is set as the base edge to "1". Thereafter, the neural network computing device 110 may delete information on the second and third edges E2 and E3 in which the merge field is set to "T".

Although not illustrated in the drawings, among edges ahead of the edges to be merged (or edges to be deleted), when there is at least one edge that is not the base edge or the merge edge, the offset field may be set for the at least one edge.

Subsequently, referring to FIG. 10I, the output address computing operation on the output data DT_out may be performed in the depth connection layer DCL. Since this is similar to the output address computing operation of the input layer INL or the first convolution layer CONV1 described above, a detailed description thereof will be omitted to avoid redundancy.

Information about the zeroth edge E0 may be updated by the output address computing operation in the depth connection layer DCL. For the updated zeroth edge E0, the source field is changed to the layer name (i.e., DCL) of the depth connection layer DCL, and the target field is changed to the output data name (i.e., DT_out). The neural network computing device 110 may compute the output address, based on the updated information of the zeroth edge E0. In this case, the computed output address may be the eighth address [A8]. The neural network computing device 110 may store the output data DT_out in a region corresponding to the eighth address [A8] of the external memory device 120.

As described above, the neural network computing device 110 according to an embodiment of the inventive concept may dynamically allocate storage space for the external memory device 120, based on layer information of each of the plurality of layers. That is, even though the storage space of the external memory device 120 is less than the total size of data input and output by the neural network computing device 110, the neural network computing device 110 may normally perform neural network computing operation. Thus, a neural network computing device having reduced cost and improved performance is provided.

According to an embodiment of the inventive concept, a neural network computing device may dynamically manage an external memory device, based on layer information of each of a plurality of layers and a memory management table. Therefore, even though a storage space of the external memory device is limited, a neural network computing device may normally perform a neural network computing operation. Accordingly, an information processing device having a reduced cost and improved performance and a method of operating the neural network computing device included therein are provided.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A method of operating a neural network computing device that is configured to communicate with an external memory device and to execute a plurality of layers, the method comprising:
   computing a first input address, based on first layer information of a first layer among the plurality of layers and a first memory management table, and updating the first memory management table to generate a second memory management table;
   reading first input data to be input to the first layer from the external memory device, based on the computed first input address;
   computing a first output address, based on the first layer information and the second memory management table, and updating the second memory management table to generate a third memory management table; and
   storing first output data output from the first layer, based on the first output address, in the external memory device, and
   wherein the first to third memory management tables are associated with the first input data or the first output data, and each include respective information on one or more edges connected to the first layer,
   wherein each information on an edge includes a size field indicating a size of data corresponding to that edge,
   wherein computing the first input address uses a size field of at least one information on an edge included in the first memory management table,
   wherein computing the first output address uses a size field of at least one information on an edge included in the second memory management table, and
   wherein a storage space of the external memory device is less than a total size of data output from the plurality of layers.

2. The method of claim 1, wherein each information on an edge further includes a source field, a target field, a toggle field, and a merge field corresponding to that edge.

3. The method of claim 2, wherein the first layer information includes a first layer name on the first layer, a first input data name on the first input data, and a first output data name on the first output data, wherein a source field of an information on an edge included in the first memory management table is set to any one of the first layer name and the first input data name, wherein a target field of the information on the edge included in the first memory management table is set to any one of the first layer name and the first output data name, wherein a toggle field of the information on the edge included in the first memory management table is set to indicate one of a plurality of regions of the external memory device, and wherein a merge field of the information on the edge included in the first memory management table is set to indicate whether that edge is to be merged.

4. The method of claim 2, wherein the first layer information includes a first layer name of the first layer and a first input data name on the first input data, and wherein the computing of the first input address, based on the first layer information and the first memory management table, and the updating of the first memory management table to generate the second memory management table, includes:

searching whether a first target field identical to the first input data name exists in the first memory management table;

updating information on a first edge corresponding to the first target field of the at least one edge, when the first target field exists in the first memory management table; and computing the input address, based on the updated information on the first edge.

5. The method of claim 4, wherein the first memory management table is updated to generate the second memory management table, by changing the source field on the first edge to the input data name and changing the target field on the first edge to the first layer name.

6. The method of claim 4, wherein the computing of the first input address, based on the first layer information and the first memory management table, and the updating of the first memory management table to generate the second memory management table, further includes determining whether a second target field identical to the first layer name exists in the first memory management table, and wherein the first memory management table is updated to generate the second memory management table, by setting the merge field of the first edge to a first value indicating a base edge when the second target field does not exist in the first memory management table, and by setting the merge field of the first edge to a second value indicating a merge edge when the second target field exists in the first memory management table.

7. The method of claim 6, further comprising deleting an edge in which the merge field is set to the second value of the at least one edge, based on the second memory management table, after reading the first input data.

8. The method of claim 6, further comprising changing the toggle field of an edge in which the merge field is set to the first value of the at least one edge, based on the second memory management table, after reading the first input data.

9. The method of claim 2, wherein the first layer information includes a first layer name of the first layer and a first output data name on the first output data, and wherein the computing of the first output address, based on the first layer information and the second memory management table, and the updating of the second memory management table to generate the third memory management table, includes:

determining whether a first target field identical to the first layer name exists in the second memory management table;

adding information on a new edge in the second memory management table, based on the first layer name and the first output data name, when the first target field does not exist in the updated memory management table;

updating information on a first edge corresponding to the first target field when the first target field exists in the second memory management table; and computing the first output address, based on the information on the new edge and the information on the updated first edge, and wherein the second memory management table is updated to generate the third memory management table, by adding the information on the new edge or by updating the information on the first edge.

10. The method of claim 9, wherein the information on the first edge is updated, when the source field of the first edge is changed to the first layer name, and the target field of the first edge is changed to the output data name.

11. The method of claim 1, further comprising:

computing a second input address, based on second layer information of a second layer among the plurality of layers and the third memory management table, and updating the third memory management table to generate a fourth memory management table; and reading second input data on the second layer from the external memory device, based on the computed second input address; and wherein the second input address is the same as the first output address when the first layer are directly connected to the second layer.

12. The method of claim 1, wherein an output address computed on the at least one of the plurality of layers is the same as the first input address.

13. An information processing apparatus comprising:

an external memory device; and a neural network computing device configured to read input data from the external memory device, perform a neural network computing operation through a plurality of layers, based on the read input data, and store a plurality of output data according to the neural network computing operation in the external memory device, wherein the neural network computing device comprises:

a neural processor configured to execute each of the plurality of layers, based on the input data to output the output data;

an internal memory configured to store a memory management table including information on an edge associated with the input data and the plurality of output data; and a processor configured to compute an input address and an output address for each of the plurality of layers, based on the memory management table and layer information of each of the plurality of layers; and a memory controller configured to read the input data from the external memory device, based on the input address, and store the output data to the external memory device, based on the output address, wherein the information on the edge includes a size field indicating a size of data corresponding to the edge, wherein the processor is configured to use the size field of the information on the edge to compute the input address, the output address, or both, and wherein a storage space of the external memory device is less than a total size of the output data from each of the plurality of layers.

14. The information processing apparatus of claim 13, wherein output addresses on at least two layers of the plurality of layers are the same to each other.

15. The information processing apparatus of claim 13, wherein the information on the edge further includes a source field, a target field, a toggle field, and a merge field corresponding to the edge.

16. The information processing apparatus of claim 15, wherein the layer information includes a layer name, an input data name, and an output data name for each of the plurality of layers,
  wherein the source field is set, by the processor, to any one of the layer name and the input data name,
  wherein the target field is set, by the processor, to any one of the layer name and the output data name,
  wherein the toggle field is set, by the processor, to indicate one of a plurality of regions of the external memory device, and
  wherein the merge field is set, by the processor, to indicate whether the at least one edge is to be merged.

17. The information processing apparatus of claim 13,
  wherein the information on the edge further includes an offset field indicates a result of merging a plurality of edges, and
  wherein the processor is configured to use the offset field of the information on the edge to compute the input address, the output address, or both.

18. The method of claim 1,
  wherein each information on an edge further includes an offset field indicates a result of merging a plurality of edges,
  wherein computing the first input address uses an offset field of at least one information on an edge included in the first memory management table, and
  wherein computing the first output address uses an offset field of at least one information on an edge included in the second memory management table.

\* \* \* \* \*